US010724848B2

(12) United States Patent
Cao et al.

(10) Patent No.: US 10,724,848 B2
(45) Date of Patent: Jul. 28, 2020

(54) METHOD AND APPARATUS FOR PROCESSING THREE-DIMENSIONAL VISION MEASUREMENT DATA

(71) Applicant: Beijing Qingying Machine Visual Technology Co., Ltd., Haidan District, Beijing (CN)

(72) Inventors: Liang Cao, Beijing (CN); Xing Yin, Jiangsu (CN)

(73) Assignee: BEIJING QINGYING MACHINE VISUAL TECHNOLOGY CO., LTD., Haidian District, Beijing (CN)

( * ) Notice: Subject to any disclaimer, the term of this patent is extended or adjusted under 35 U.S.C. 154(b) by 0 days.

(21) Appl. No.: 16/327,463

(22) PCT Filed: Aug. 29, 2016

(86) PCT No.: PCT/CN2016/097162
§ 371 (c)(1),
(2) Date: Feb. 22, 2019

(87) PCT Pub. No.: WO2018/039871
PCT Pub. Date: Mar. 8, 2018

(65) Prior Publication Data
US 2019/0195616 A1  Jun. 27, 2019

(51) Int. Cl.
*G06T 19/20* (2011.01)
*G01B 11/00* (2006.01)
(Continued)

(52) U.S. Cl.
CPC ............ *G01B 11/002* (2013.01); *G01B 11/22* (2013.01); *G06T 1/0014* (2013.01); *G06T 7/60* (2013.01);
(Continued)

(58) Field of Classification Search
CPC .... G06T 7/73; G06T 7/60; G06T 7/70; G06T 11/60; G06T 19/20; G06T 2207/10028;
(Continued)

(56) References Cited

U.S. PATENT DOCUMENTS

2011/0187704 A1   8/2011  Chen et al.

FOREIGN PATENT DOCUMENTS

CN  103006228 A   4/2013
CN  104007444 A   8/2014
(Continued)

OTHER PUBLICATIONS

International Search Report and Written Opinion, with English translation thereof, dated May 27, 2017 for corresponding International Application No. PCT/CN2016/097162.

*Primary Examiner* — Mesfin T Asfaw
(74) *Attorney, Agent, or Firm* — Tarolli, Sundheim, Covell & Tummino LLP

(57) ABSTRACT

A method and an apparatus for processing three-dimensional vision measurement data are provided. The method includes: obtaining three-dimensional point cloud data measured by a three-dimensional machine vision measurement system and establishing a visualized space based thereon; establishing a new three-dimensional rectangular coordinate system corresponding to the visualized space, and performing coordinate translation conversion on the three-dimensional point cloud data; determining three basic observation planes corresponding to the visualized space and a rectangular coordinate system corresponding to the basic observation planes; respectively projecting the three-dimensional point cloud data on the basic observation planes to obtain three plane projection functions; respectively generating, according to the three-dimensional point cloud data, three depth value functions corresponding to the plane projection
(Continued)

functions; digitally processing three plane projection graphs and three depth graphs respectively, and converting same to two-dimensional images of a specified format; and compressing, storing and displaying the two-dimensional images of the specified format.

16 Claims, 4 Drawing Sheets

(51) Int. Cl.
    *G06T 7/60* (2017.01)
    *G06T 7/90* (2017.01)
    *G01B 11/22* (2006.01)
    *G06T 1/00* (2006.01)

(52) U.S. Cl.
    CPC ............ *G06T 7/90* (2017.01); *G06T 2200/04* (2013.01); *G06T 2200/08* (2013.01); *G06T 2207/10024* (2013.01); *G06T 2207/10028* (2013.01); *G06T 2207/20068* (2013.01)

(58) Field of Classification Search
CPC ..... G06T 2200/24; G06T 7/0004; G06T 7/50; G06T 7/80; G06T 11/00; G06T 13/80; G06T 7/0002; G06T 7/55; G06T 15/60; G06T 15/80; G06T 17/00; G06T 2200/04; G06T 2207/10061; G06T 2207/30168; G06T 3/60; G06T 5/006; G06T 7/001; G06T 7/12; G06T 11/203; G06T 15/02; G06T 15/08; G06T 15/10; G06T 15/503; G06T 15/506; G06T 19/00; G06T 2200/28; G06T 2207/10048; G06T 2207/20224; G06T 5/002; G06T 7/00; G06T 7/11; G06T 7/13; G06T 7/593; G06T 7/62; G06T 7/75; G06T 7/97; G06T 1/0014; G06T 2200/08; G06T 2207/10024; G06T 2207/20068; G06T 7/90; G06F 3/04845; G06F 3/048; G06F 3/04815; G06F 3/14; G06F 3/0304; H04N 13/243; H04N 13/189; H04N 5/23229; H04N 5/23238; H04N 5/23299; H04N 7/183; H04N 13/111; H04N 13/366; H04N 5/2253; H04N 5/2254; H04N 7/185; H04N 13/106; H04N 13/128; H04N 13/156; H04N 13/239; H04N 13/25; H04N 13/275; H04N 13/282; H04N 13/388; H04N 17/002; H04N 1/32267; H04N 21/816; H04N 5/147; H04N 5/225; H04N 5/2258; H04N 5/23203; H04N 5/23212; H04N 5/23216; H04N 5/23218; H04N 5/23222; H04N 5/23254; H04N 7/181; H04N 9/3185; H04N 9/3194; G01B 11/002; G01B 11/22
See application file for complete search history.

(56) References Cited

FOREIGN PATENT DOCUMENTS

| | | |
|---|---|---|
| CN | 104484852 A | 4/2015 |
| CN | 105574905 A | 5/2016 |
| CN | 105574933 A | 5/2016 |
| CN | 105678683 A | 6/2016 |
| CN | 105809615 A | 7/2016 |

METHOD AND APPARATUS FOR PROCESSING THREE-DIMENSIONAL VISION MEASUREMENT DATA

RELATED APPLICATIONS

The present application is a U.S. National Stage application under 35 USC 371 of PCT Application Serial No. PCT/CN2016/097162, filed on 29 Aug. 2016; the entirety of which is incorporated herein by reference.

TECHNICAL FIELD

The present disclosure relates to the technical field of data processing, and particularly to a method and apparatus for processing three-dimensional vision measurement data.

BACKGROUND ART

Currently, a three-dimensional point cloud data format is generally used as a method for digitally describing the position and size of an object in three-dimensional space. Three-dimensional data collection devices corresponding to data in this format mainly include a three-dimensional scanner, a three-dimensional coordinate measuring instrument, remote sensing and aerial surveying devices, and so on. Three-dimensional point cloud data and its corresponding collection means are generally used for various aspects, such as engineering design, reverse engineering, geodetic survey, preservation of cultural relics and three-dimensional reconstruction. These point cloud data are commonly obtained by superposing data results of multiple multi-angle measurements, and these point cloud data are substantially processed by means of post processing; however, three-dimensional point cloud data processing software requires human intervention in performing each of the operations, such as background separation, data stitching, size measurement and three-dimensional reconstruction.

PCT Application No. PCT/CN2016/079274 (hereinafter referred to simply as Document 1) discloses a method of realizing three-dimensional machine vision measurement by use of a planar array of a group of four cameras, by which it is capable of realizing three-dimensional perception to the field of vision by processing two-dimensional images measured by the group of four cameras. The three-dimensional point cloud data obtained by this measurement method are data corresponding to the two-dimensional images. Besides three-dimensional coordinate information, these data include color or gray information of a view point on a viewed object. It is difficult for the prior three-dimensional point cloud data processing software and processing methods to meet requirements of such a three-dimensional machine vision measurement system.

The application for patent invention with Publication No. CN105678683A discloses a method for two-dimensionally storing a three-dimensional model. With this method, point cloud data are simply projected onto planes of a coordinate system, and then depth information of the model formed by the projection onto each plane is transformed into gray information of the corresponding two-dimensional plane. However, this method has the following problems: a) only coordinate information of the point cloud data is considered, without taking into account color value or gray value information of the point cloud data; b) the whole three-dimensional point cloud data are directly processed, which causes a large data process load and a relatively high complexity, and moreover, the adopted operations, such as interpolation and point adding, easily cause interference and distortion to the model; and c) the method does not specify corresponding relationship between the point cloud data and the two-dimensional projection data, fails to explicitly describe definition of the two-dimensional plane and stitching relationships among the six two-dimensional planes, and also fails to clearly describe a situation that multiple points in the point cloud data may be on a same projection line.

For the three-dimensional machine vision measurement system, what we expected is to perform rapid and accurate three-dimensional data description of the objective world just like human eyes. However, three-dimensional data handling and processing capabilities of the three-dimensional machine vision measurement systems we have come into contact with at present are far from the "WYSIWYG (what you see is what you get)" function of the human eyes. To sum up, for post data processing means and data processing methods of a set of three-dimensional machine vision measurement systems, the current problems are mainly reflected in the following aspects:

1. data collection and storage are substantially put on point cloud data, and these data are stored in a large amount with ununiform formats, meanwhile, the stored information is not complete enough;

2. a large amount of post processing and computation are required for the three-dimensional display of the distribution of the shape, size and depth space of the viewed object, and for the separation between the objects and the separation between the objects and the background, so as to reflect the detailed external features of the three-dimensional objects; and 3. current mainstream software requires human intervention in performing the above-mentioned operations, and there is almost no software and tool that directly generate or automatically calculate three-dimensional features of the viewed object by means of the three-dimensional machine vision measurement system.

DISCLOSURE OF THE INVENTION

In view of this, an objective of embodiments of the present disclosure is to provide a method and apparatus for processing three-dimensional vision measurement data. With the method and apparatus provided by the present disclosure, three-dimensional point cloud data measured by a three-dimensional machine vision measurement system are directly handled and processed to intuitively reflect the measured three-dimensional data information onto two-dimensional images. Therefore, it is able to reflect true features of the real world quickly and accurately, and the generated data are convenient for operations, such as storage, calling, size measurement, distance calculation, and subsequent stitching and superposition of multiple measurements, satisfying requirements of three-dimensional machine vision and realizing the three-dimensional display function.

In a first aspect, an embodiment of the present disclosure provides a method for processing three-dimensional vision measurement data, comprising:

step 1, acquiring three-dimensional point cloud data measured by a three-dimensional machine vision measurement system;

step 2, establishing a viewed space based on the three-dimensional point cloud data;

step 3, establishing a new three-dimensional rectangular coordinate system corresponding to the viewed space, and performing coordinate translation transformation on the three-dimensional point cloud data;

step 4, determining three basic observation planes corresponding to the viewed space, and a rectangular coordinate system corresponding to the three basic observation planes;

step 5, projecting the transformed three-dimensional point cloud data onto the three basic observation planes, respectively, to obtain three plane projection functions;

step 6, generating three depth value functions corresponding to the three plane projection functions based on the transformed three-dimensional point cloud data, respectively;

step 7, digitizing the three plane projection functions and the three depth value functions, respectively, and transforming them into two-dimensional images in a determined format, to obtain three plane projection images and three depth images; and step 8, compressing, storing and displaying the three plane projection images and the three depth images.

Furthermore, the step 1 comprises: establishing a basic three-dimensional rectangular coordinate system OXYZ based on the three-dimensional machine vision measurement system, with the three-dimensional point cloud data represented by $I_{uv}(i, j)$, where $$I_{uv}(i, j) = \sum_{i=0}^{u-1} \sum_{j=0}^{v-1} [x(i, j), y(i, j), z(i, j), R(i, j), G(i, j), B(i, j)]$$

or $$I_{uv}(i, j) = \sum_{i=0}^{u-1} \sum_{j=0}^{v-1} [x(i, j), y(i, j), z(i, j), g(i, j)]$$

where the three-dimensional point cloud data are a collection of data of a surface of a viewed object that is obtained from a measurement result of a single measurement by the three-dimensional machine vision measurement system, the collection of data corresponds to a multi-curved distributed spatial structure consisting of discrete points; u and v are the numbers of measurement points or pixel points in a width direction and a height direction of a two-dimensional measurement plane corresponding to the single measurement by the three-dimensional machine vision measurement system, respectively; i and j represent a position of a measurement point or pixel point in the two-dimensional measurement plane, where $0 \le i \le u-1$, $0 \le j \le v-1$, and each of i and j is an integer; $x(i, j)$, $y(i, j)$ and $z(i, j)$ are spatial position coordinates of a view point corresponding to the measurement point or pixel point measured by the three-dimensional machine vision measurement system; $R(i, j)$, $G(i, j)$ and $B(i, j)$ are color values of a surface of the view point corresponding to the measurement point or pixel point measured by the three-dimensional machine vision measurement system; and $g(i, j)$ is a gray value of the surface of the view point corresponding to the measurement point or pixel point measured by the three-dimensional machine vision measurement system.

Furthermore, in the step 1, the three-dimensional machine vision measurement system refers to a system capable of measuring spatial position information of a viewed object in space and obtaining three-dimensional coordinates and color information or gray information of a view point on the viewed object, including a binocular vision three-dimensional measurement system and a four-camera vision three-dimensional measurement system.

Furthermore, the step 2 comprises: making the viewed space form a rectangular parallelepiped with a depth of L, a width of W and a height of H, based on the three-dimensional point cloud data, where $L = z_{max} - z_{min} + \delta l$, $W = x_{max} - x_{min} + \delta w$, $H = y_{max} - y_{min} + \delta h$, where $z_{max}$ is a maximum depth coordinate in the three-dimensional point cloud data, $z_{min}$ is a minimum depth coordinate in the three-dimensional point cloud data, $x_{max}$ is a maximum width coordinate in the three-dimensional point cloud data, $x_{min}$ is a minimum width coordinate in the three-dimensional point cloud data, $y_{max}$ is a maximum height coordinate in the three-dimensional point cloud data, $y_{min}$ is a minimum height coordinate in the three-dimensional point cloud data, $\delta l$ is a depth adjustment value of the viewed space, $\delta w$ is a width adjustment value of the viewed space, and $\delta h$ is a height adjustment value of the viewed space.

Furthermore, the step 3 comprises: establishing a new three-dimensional rectangular coordinate system $O_1 X_1 Y_1 Z_1$, with the new three-dimensional rectangular coordinate system taking a point $O_1$ at a lower left corner of a face, facing directly the three-dimensional machine vision measurement system, of the rectangular parallelepiped corresponding to the viewed space as a coordinate origin; and in a case that coordinates of $O_1$ in the basic three-dimensional rectangular coordinate system OXYZ are represented by (a, b, c), performing coordinate translation transformation on the three-dimensional point cloud data, to obtain the transformed three-dimensional point cloud data represented by $J_{uv}(i, j)$, where $$J_{uv}(i, j) = \sum_{i=0}^{u-1} \sum_{j=0}^{v-1} [(x(i, j) - a), (y(i, j) - b), (z(i, j) - c), R(i, j), G(i, j), B(i, j)]$$

or $$J_{uv}(i, j) = \sum_{i=0}^{u-1} \sum_{j=0}^{v-1} [(x(i, j) - a), (y(i, j) - b), (z(i, j) - c), g(i, j)].$$

Furthermore, the determining three basic observation planes corresponding to the viewed space in the step 4 comprises determining:

a front-view observation plane (F), for which an observation direction is a direction indicated by a $Z_1$-axis arrow, where the front-view observation plane has a coordinate origin located at $O_1$, an abscissa axis corresponding to the front-view observation plane is an $X_1$ axis, and an ordinate axis corresponding to the front-view observation plane is a $Y_1$ axis;

a right-view observation plane (R), for which the observation direction is a direction opposite to that indicated by an $X_1$-axis arrow, where the right-view observation plane has a coordinate origin located at $O_2$, an abscissa axis corresponding to the right-view observation plane is a $Z_1$ axis, and an ordinate axis corresponding to the right-view observation plane is the $Y_1$ axis; and a top-view observation plane (U), for which the observation direction is a direction opposite to that indicated by a $Y_1$-axis arrow, where the top-view observation plane has a coordinate origin located at $O_3$, an abscissa axis corresponding to the top-view observation plane is the $X_1$ axis, and an ordinate axis corresponding to the top-view observation plane is the $Z_1$ axis.

Furthermore, the step 5 comprises: projecting the transformed three-dimensional point cloud data onto the three basic observation planes, respectively, and performing coordinate value transformation, to obtain from the projection a front-view plane projection function represented by $[F(x_1, y_1), 0 \leq x_1 \leq W, 0 \leq y_1 \leq H]$, a right-view plane projection function represented by $[R(z_1, y_1), 0 \leq z_1 \leq L, 0 \leq y_1 \leq H]$ and a top-view plane projection function represented by $[U(x_1, z_1), 0 \leq x_1 \leq W, 0 \leq z_1 \leq L]$, where for $J_{uv}(i, j)$,
as to the front-view plane projection function $F(x_1, y_1)$:
if $x_1 = x(i, j) - a$ and $y_1 = y(i, j) - b$, then $$F(x_1, y_1) = [R(i,j), G(i,j), B(i,j)]$$

or $$F(x_1, y_1) = g(i,j),$$

as to the right-view plane projection function $R(z_1, y_1)$:
if $z_1 = z(i, j) - c$ and $y_1 = y(i, j) - b$, then $$R(z_1, y_1) = [R(i,j), G(i,j), B(i,j)]$$

or $$R(z_1, y_1) = g(i,j),$$

as to the top-view plane projection function $U(x_1, z_1)$:
if $x_1 = x(i, j) - a$ and $z_1 = z(i, j) - c$, then $$U(x_1, z_1) = [R(i,j), G(i,j), B(i,j)]$$

or $$U(x_1, z_1) = g(i,j).$$

Furthermore, in the step 6, the generating three depth value functions corresponding to the three plane projection functions based on the transformed three-dimensional point cloud data respectively, comprises generating a front-view depth value function represented by $[FS(x_1, y_1), 0 \leq x_1 \leq W, 0 \leq y_1 \leq H]$, a right-view depth value function represented by $[RS(z_1, y_1), 0 \leq z_1 \leq L, 0 \leq y_1 \leq H]$ and a top-view depth value function represented by $[US(x_1, z_1), 0 \leq x_1 \leq W, 0 \leq z_1 \leq L]$,
where for $J_{uv}(i, j)$, the above depth value functions are generated:
as to the front-view depth value function:
if $x_1 = x(i, j) - a$ and $y_1 = y(i, j) - b$, then $$FS(x_1, y_1) = z_1 = z(i, j) - c$$

as to the right-view depth value function:
if $z_1 = z(i, j) - c$ and $y_1 = y(i, j) - b$, then $$RS(z_1, y_1) = W - x_1 = W - (x(i, j) - a)$$

as to the top-view depth value function:
if $x_1 = x(i, j) - a$ and $z_1 = z(i, j) - c$, then $$US(x_1, z_1) = H - y_1 = H - (y(i, j) - b).$$

Furthermore, the step 7 comprises: transforming each of the front-view plane projection function, the right-view plane projection function, the top-view plane projection function, the front-view depth value function, the right-view depth value function and the top-view depth value function into a two-dimensional image in a determined format having u×v pixel points, with the two-dimensional images in the determined format corresponding to the individual functions represented as a front-view plane projection image FT in the determined format, a right-view plane projection image RT in the determined format, a top-view plane projection image UT in the determined format, a front-view depth image FST in the determined format, a right-view depth image RST in the determined format and a top-view depth image UST in the determined format, respectively;
firstly, determining pixel sizes of the two-dimensional images in the determined format respectively,
with pixel sizes corresponding to the FT image and the FST image determined as:

$$\mu_{xF} = \frac{W}{u}; \mu_{yF} = \frac{H}{v},$$

with pixel sizes corresponding to the RT image and the RST image determined as:

$$\mu_{zR} = \frac{L}{u}; \mu_{yR} = \frac{H}{v},$$

with pixel sizes corresponding to the UT image and the UST image determined as:

$$\mu_{xU} = \frac{W}{u}; \mu_{zU} = \frac{L}{v}$$

where $\mu_{xF}$ and $\mu_{yF}$ are pixel sizes of the FT image and the FST image in the width direction and in the height direction respectively, $\mu_{zR}$ and $\mu_{yR}$ are pixel sizes of the RT image and the RST image in the width direction and in the height direction respectively, and $\mu_{xU}$ and $\mu_{zU}$ are pixel sizes of the UT image and the UST image in the width direction and in the height direction respectively; wherein after computation of the pixel size, a computed result is obtained to be used as a final pixel size, with digits of a fixed number of the computed result determined as significant digits according to image measurement range and accuracy requirements,
wherein the last digit is determined by a rounding-off method, so as to facilitate post processing and computation of the image;
digitizing coordinates of the pixel points in a format of u×v after the pixel sizes are determined, where in the following computations, coordinates i or j of the pixel points, when being decimals, each are rounded to a positive integer no more than u or v,
so as to for $J_{uv}(i, j)$ generate:
the front-view plane projection image (FT) in the determined format as follows:

supposing $$i = \frac{x_1}{\mu_{xF}} \text{ and } j = \frac{y_1}{\mu_{yF}}, \text{ then}$$

$$FT(i, j) = F(x_1, y_1)$$

$$FT_{uv}(i, j) = \sum_{i=0}^{u-1} \sum_{j=0}^{v-1} [FT(i, j)]$$

the right-view plane projection image (RT) in the determined format as follows:
supposing $$i = \frac{z_1}{\mu_{zR}} \text{ and } j = \frac{y_1}{\mu_{yR}}, \text{ then}$$

$$RT(i, j) = R(z_1, y_1)$$

$$RT_{uv}(i, j) = \sum_{i=0}^{u-1} \sum_{j=0}^{v-1} [RT(i, j)]$$

the top-view plane projection image (UT) in the determined format as follows:
supposing $$i = \frac{x_1}{\mu_{xU}} \text{ and } j = \frac{z_1}{\mu_{zU}}, \text{ then}$$

$$UT(i, j) = U(x_1, z_1)$$

$$UT_{uv}(i, j) = \sum_{i=0}^{u-1} \sum_{j=0}^{v-1} [UT(i, j)]$$

digitizing depth values according to 0 to (N−1) gray values when generating the depth images in the determined format, where N is the number of the gray values, and in the following computations, depth values, when being decimals, each are rounded to a positive integer no more than (N−1),
where the depth images in the determined format are as follows:
as to the front-view depth image (FST) in the determined format:
supposing $$i = \frac{x_1}{\mu_{xF}} \text{ and } j = \frac{y_1}{\mu_{yF}}, \text{ then}$$

$$FST(i, j) = \frac{FS(x_1, y_1)}{L} \times (N - 1)$$

$$FST_{uv}(i, j) = \sum_{i=0}^{u-1} \sum_{j=0}^{v-1} [FST(i, j)]$$

as to the right-view depth image (RST) in the determined format:
supposing $$i = \frac{z_1}{\mu_{zR}} \text{ and } j = \frac{y_1}{\mu_{yR}}, \text{ then}$$

$$RST(i, j) = \frac{RS(z_1, y_1)}{W} \times (N - 1)$$

$$RST_{uv}(i, j) = \sum_{i=0}^{u-1} \sum_{j=0}^{v-1} [RST(i, j)]$$

as to the top-view depth image (UST) in the determined format:
supposing $$i = \frac{x_1}{\mu_{xU}} \text{ and } j = \frac{z_1}{\mu_{zU}}, \text{ then}$$

$$UST(i, j) = \frac{US(x_1, z_1)}{H} \times (N - 1)$$

$$UST_{uv}(i, j) = \sum_{i=0}^{u-1} \sum_{j=0}^{v-1} [UST(i, j)].$$

In a second aspect, an embodiment of the present disclosure provides an apparatus for processing three-dimensional vision measurement data, comprising:
a data reading module, configured to acquire three-dimensional point cloud data measured by a three-dimensional machine vision measurement system;
a viewed space setting module, configured to establish a viewed space based on the three-dimensional point cloud data;
a coordinate transformation module, configured to establish a new three-dimensional rectangular coordinate system corresponding to the viewed space, and perform coordinate translation transformation on the three-dimensional point cloud data;
a basic observation plane setting module, configured to determine three basic observation planes corresponding the viewed space and a rectangular coordinate system corresponding to the three basic observation planes;
a projection function generating module, configured to project the transformed three-dimensional point cloud data onto the three basic observation planes, respectively, to obtain three plane projection functions;
a depth value function generating module, configured to generate three depth value functions corresponding to the three plane projection functions based on the transformed three-dimensional point cloud data, respectively;
a two-dimensional image generating module, configured to digitize the three plane projection functions and the three depth value functions, respectively, and transform them into two-dimensional images in a determined format, to obtain three plane projection images and three depth images; and
a compression module, a storage module and a display module, configured to compress, store, and display the three plane projection images and the three depth images, respectively.
Furthermore, the data reading module is configured to establish a basic three-dimensional rectangular coordinate system OXYZ based on the three-dimensional machine vision measurement system, with the three-dimensional point cloud data represented by $I_{Uv}(i, j)$, where $$I_{uv}(i, j) = \sum_{i=0}^{u-1} \sum_{j=0}^{v-1} [x(i, j), y(i, j), z(i, j), R(i, j), G(I, j), B(i, j)]$$

or $$I_{uv}(i, j) = \sum_{i=0}^{u-1}\sum_{j=0}^{v-1}[x(i, j), y(i, j), z(i, j), g(i, j)]$$

where the three-dimensional point cloud data are a collection of data of a surface of a viewed object that is obtained from a measurement result of a single measurement by the three-dimensional machine vision measurement system, the collection of data corresponds to a multi-curved distributed spatial structure consisting of discrete points; u and v are the numbers of measurement points or pixel points in a width direction and a height direction of a two-dimensional measurement plane corresponding to the single measurement by the three-dimensional machine vision measurement system, respectively; i and j represent a position of a measurement point or pixel point in the two-dimensional measurement plane, where $0 \le i \le u-1$, $0 \le j \le v-1$, and each of i and j is an integer; $x(i, j)$, $y(i, j)$ and $z(i, j)$ are spatial position coordinates of a view point corresponding to the measurement point or pixel point measured by the three-dimensional machine vision measurement system; $R(i, j)$, $G(i, j)$ and $B(i, j)$ are color values of a surface of the view point corresponding to the measurement point or pixel point measured by the three-dimensional machine vision measurement system; and $g(i, j)$ is a gray value of the surface of the view point corresponding to the measurement point or pixel point measured by the three-dimensional machine vision measurement system.

Furthermore, the three-dimensional machine vision measurement system refers to a system capable of measuring spatial position information of a viewed object in space and obtaining three-dimensional coordinates and color information or gray information of a view point on the viewed object, including a binocular vision three-dimensional measurement system and a four-camera vision three-dimensional measurement system.

Furthermore, the viewed space setting module is configured to form the viewed space into a rectangular parallelepiped with a depth of L, a width of W and a height of H, based on the three-dimensional point cloud data, where $$L = z_{max} - z_{min} \, \delta l,$$

$$W = x_{max} - x_{min} \, \delta w,$$

$$H = y_{max} - y_{min} + \delta h,$$

where $z_{max}$ is a maximum depth coordinate in the three-dimensional point cloud data, $z_{min}$ is a minimum depth coordinate in the three-dimensional point cloud data, $x_{max}$ is a maximum width coordinate in the three-dimensional point cloud data, $x_{min}$ is a minimum width coordinate in the three-dimensional point cloud data, $y_{max}$ is a maximum height coordinate in the three-dimensional point cloud data, $y_{min}$ is a minimum height coordinate in the three-dimensional point cloud data, $\delta l$ is a depth adjustment value of the viewed space, $\delta w$ is a width adjustment value of the viewed space, and $\delta h$ is a height adjustment value of the viewed space.

Furthermore, the coordinate transformation module is configured to establish a new three-dimensional rectangular coordinate system $O_1 X_1 Y_1 Z_1$, with the new three-dimensional rectangular coordinate system taking a point $O_1$ at a lower left corner of a face, facing directly the three-dimensional machine vision measurement system, of the rectangular parallelepiped corresponding to the viewed space as a coordinate origin; and in a case that coordinates of $O_1$ in the basic three-dimensional rectangular coordinate system OXYZ are represented by (a, b, c), perform coordinate translation transformation on the three-dimensional point cloud data, to obtain the transformed three-dimensional point cloud data represented by $J_{uv}(i, j)$, where $$J_{uv}(i, j) = \sum_{i=0}^{u-1}\sum_{j=0}^{v-1}[(x(i,j)-a), (y(i,j)-b), (z(i,j)-c), R(i,j), G(I,j), B(i,j)]$$

or $$J_{uv}(i, j) = \sum_{i=0}^{u-1}\sum_{j=0}^{v-1}[(x(i,j)-a), (y(i,j)-b), (z(i,j)-c), g(i,j)].$$

Furthermore, the basic observation plane setting module is configured to determine the three basic observation planes corresponding to the viewed space as:
- a front-view observation plane (F), for which an observation direction is a direction indicated by a $Z_1$-axis arrow, where the front-view observation plane has a coordinate origin located at $O_1$, an abscissa axis corresponding to the front-view observation plane is an $X_1$ axis, and an ordinate axis corresponding to the front-view observation plane is a $Y_1$ axis;
- a right-view observation plane (R), for which the observation direction is a direction opposite to that indicated by an $X_1$-axis arrow, where the right-view observation plane has a coordinate origin located at $O_2$, an abscissa axis corresponding to the right-view observation plane is a $Z_1$ axis, and an ordinate axis corresponding to the right-view observation plane is the $Y_1$ axis; and
- a top-view observation plane (U), for which the observation direction is a direction opposite to that indicated by a $Y_1$-axis arrow, where the top-view observation plane has a coordinate origin located at $O_3$, an abscissa axis corresponding to the top-view observation plane is the $X_1$ axis, and an ordinate axis corresponding to the top-view observation plane is the $Z_1$ axis.

Furthermore, the projection function generating module is configured to project the transformed three-dimensional point cloud data onto the three basic observation planes, respectively, and perform coordinate value transformation, to obtain form the projection a front-view plane projection function represented by $[F(x_1, y_1), 0 \le x_1 \le W, 0 \le y_1 \le H]$, a right-view plane projection function represented by $[R(z_1, y_1), 0 \le z_1 \le L, 0 \le y_1 \le H]$ and a top-view plane projection function represented by $[U(x_1, z_1), 0 \le x_1 \le W, 0 \le z_1 \le L]$,
where for $J_{uv}(i, j)$,
as to the front-view plane projection function $F(x_1, y_1)$:
if $x_1 = x(i, j) - a$ and $y_1 = y(i, j) - b$, then $$F(x_1, y_1) = [R(i,j), G(i,j), B(i,j)]$$

or $$F(x_1, y_1) = g(i,j),$$

as to the right-view plane projection function $R(z_1, y_1)$
if $z_1 = z(i, j) - c$ and $y_1 = y(i, j) - b$, then $$R(z_1, y_1) = [R(i,j), G(i,j), B(i,j)]$$

or $$R(z_1, y_1) = g(i,j),$$

as to the top-view plane projection function $U(x_1, z_1)$
if $x_1=x(i, j)-a$ and $z_1=z(i, j)-c$, then $$U(x_1,z_1)=[R(i,j),G(i,j),B(i,j)]$$

or $$U(x_1,z_1)=g(i,j).$$

Furthermore, the depth value function generating module is configured to generate, based on the transformed three-dimensional point cloud data, three depth value functions corresponding to the three plane projection functions, respectively, which are a front-view depth value function represented by $[FS(x_1, y_1), 0 \le x_1 \le W, 0 \le y_1 \le H]$, a right-view depth value function represented by $[RS(z_1, y_1), 0 \le z_1 \le L, 0 \le y_1 \le H]$ and a top-view depth value function represented by $[US(x_1, z_1), 0 \le x_1 \le W, 0 \le z_1 \le L]$, where for $J_{uv}(i, j)$, the above depth value functions are generated:
as to the front-view depth value function:
if $x_1=x(i, j)-a$ and $y_1=y(i, j)-b$, then $$FS(x_1, y_1) = z_1 = z(i, j) - c$$

as to the right-view depth value function:
if $z_1=z(i, j)-c$ and $y_1=y(i, j)-b$, then $$RS(z_1, y_1) = W - x_1 = W - (x(i, j) - a)$$

as to the top-view depth value function:
if $x_1=x(i, j)-a$ and $z_1=z(i, j)-c$, then $$US(x_1, z_1) = H - y_1 = H - (y(i, j) - b).$$

Furthermore, the two-dimensional image generating module is configured to transform each of the front-view plane projection function, the right-view plane projection function, the top-view plane projection function, the front-view depth value function, the right-view depth value function and the top-view depth value function into a two-dimensional image in a determined format having u×v pixel points, with the two-dimensional images in the determined format corresponding to the individual functions represented as a front-view plane projection image FT in the determined format, a right-view plane projection image RT in the determined format, a top-view plane projection image UT in the determined format, a front-view depth image FST in the determined format, a right-view depth image RST in the determined format and a top-view depth image UST in the determined format, respectively;

the two-dimensional image generating module is further configured to firstly determine pixel sizes of the two-dimensional images in the determined format, respectively,
with pixel sizes corresponding to the FT image and the FST image determined as:

$$\mu_{xF} = \frac{W}{u}; \mu_{yF} = \frac{H}{v},$$

with pixel sizes corresponding to the RT image and the RST image determined as:

$$\mu_{zR} = \frac{L}{u}; \mu_{yR} = \frac{H}{v},$$

with pixel sizes corresponding to the UT image and the UST image determined as:

$$\mu_{xU} = \frac{W}{u}; \mu_{zU} = \frac{L}{v}$$

where $\mu_{xF}$ and $\mu_{yF}$ are pixel sizes of the FT image and the FST image in the width direction and in the height direction respectively, $\mu_{zR}$ and $\mu_{yR}$ are pixel sizes of the RT image and the RST image in the width direction and in the height direction respectively, and $\mu_{xU}$ and $\mu_{zU}$ are pixel sizes of the UT image and the UST image in the width direction and in the height direction respectively; wherein after computation of the pixel size, a computed result is obtained to be used as a final pixel size, with digits of a fixed number of the computed result determined as significant digits according to image measurement range and accuracy requirements, where the last digit is determined by a rounding-off method, so as to facilitate post processing and computation of the image;

the two-dimensional image generating module is further configured to digitize coordinates of the pixel points in a format of u×v after the pixel sizes are determined, where in the following computations, coordinates i or j of the pixel points, when being decimals, each are rounded to a positive integer no more than u or v, so as to for $J_{uv}(i, j)$ generate:
the front-view plane projection image (FT) in the determined format as follows:
supposing $$i = \frac{x_1}{\mu_{xF}} \text{ and } j = \frac{y_1}{\mu_{yF}}, \text{ then}$$

$$FT(i, j) = F(x_1, y_1)$$

$$FT_{uv}(i, j) = \sum_{i=0}^{u-1}\sum_{j=0}^{v-1}[FT(i, j)]$$

the right-view plane projection image (RT) in the determined format as follows:
supposing $$i = \frac{z_1}{\mu_{zR}} \text{ and } j = \frac{y_1}{\mu_{yR}}, \text{ then}$$

$$RT(i, j) = R(z_1, y_1)$$

$$RT_{uv}(i, j) = \sum_{i=0}^{u-1}\sum_{j=0}^{v-1}[RT(i, j)]$$

the top-view plane projection image (UT) in the determined format as follows:
supposing $$i = \frac{x_1}{\mu_{xU}} \text{ and } j = \frac{z_1}{\mu_{zU}}, \text{ then}$$

$$UT(i, j) = U(x_1, z_1)$$

$$UT_{uv}(i, j) = \sum_{i=0}^{u-1}\sum_{j=0}^{v-1}[UT(i, j)]$$

the two-dimensional image generating module is further configured to digitize depth values according to 0 to (N−1) gray values when generating the depth images in the determined format, where N is the number of the gray values, and in the following computations, depth values, when being decimals, each are rounded to a positive integer no more than (N−1), where the depth images in the determined format are as follows:
as to the front-view depth image (FST) in the determined format:
supposing $$i = \frac{x_1}{\mu_{xF}} \text{ and } j = \frac{y_1}{\mu_{yF}}, \text{ then}$$

$$FST(i, j) = \frac{FS(x_1, y_1)}{L} \times (N-1)$$

$$FST_{uv}(i, j) = \sum_{i=0}^{u-1}\sum_{j=0}^{v-1}[FST(i, j)]$$

as to the right-view depth image (RST) in the determined format:
supposing $$i = \frac{z_1}{\mu_{zR}} \text{ and } j = \frac{y_1}{\mu_{yR}}, \text{ then}$$

$$RST(i, j) = \frac{RS(z_1, y_1)}{W} \times (N-1)$$

$$RST_{uv}(i, j) = \sum_{i=0}^{u-1}\sum_{j=0}^{v-1}[RST(i, j)]$$

as to the top-view depth image (UST) in the determined format:
supposing $$i = \frac{x_1}{\mu_{xU}} \text{ and } j = \frac{z_1}{\mu_{zU}}, \text{ then}$$

$$UST(i, j) = \frac{US(x_1, z_1)}{H} \times (N-1)$$

$$UST_{uv}(i, j) = \sum_{i=0}^{u-1}\sum_{j=0}^{v-1}[UST(i, j)].$$

The present disclosure has at least the following several beneficial effects:

1. The method and apparatus provided by the present disclosure restore the three-dimensional point cloud data collected at a time by the three-dimensional machine vision measurement system onto rectangular coordinate planes perpendicular to one another, to obtain six two-dimensional images FT, RT, UT, FST, RST and UST, in which the three-dimensional information of the measured space is completely expressed, to make the description of the three-dimensional space intuitive and easily understandable; from the individual two-dimensional images, the three-dimensional size and spatial position of a viewed object can be obtained, and the gray value or color value information of any point can be obtained, which is convenient for subsequent use by machine intelligence; and moreover, various processing and computations, such as stitching, compression and storage, can be performed on the six images by use of the prior two-dimensional image processing technology, so that the operational data are called quickly and conveniently, the computation speed is significantly accelerated, and the occupied storage space is reduced.

2. Unlike the prior two-dimensional images, the FT, RT, UT, FST, RST and UST images do not follow the principle of perspective, the position of any pixel point in each of the images uniquely corresponds to an actual spatial position of a view point corresponding to the pixel point, and the spatial position coordinates of a view point corresponding to each pixel point in all the images can be obtained by combining the FT, RT, UT, FST, RST and UST images. During computation of other positions and sizes, a corresponding distance between the individual pixel points can be obtained by directly calculating the number of points by which the individual pixel points are spaced and then multiplying the same by the pixel size.

3. The method and apparatus of the present disclosure are suitable for processing results obtained from a single measurement by the three-dimensional machine vision measurement system, and then storing and displaying them. When the same measurement system carries out continuous measurements, two-dimensional images in a determined format which are continuous over time can be obtained; and if the measured two-dimensional images are displayed continuously, a continuous three-dimensional vision is achieved, generating a dynamic effect like a movie. Three-dimensional data or images corresponding to a viewed object can be measured from multiple angles, by moving or rotating the viewed object; and different sides of the same viewed object can be reflected from different angles, if the measurement system is moved.

4. For storage of the measurement data, only a front-view plane projection image in the determined format and a front-view depth image in the determined format are needed for completely storing data from a single measurement. A right-view plane projection image in the determined format, a right-view depth image in the determined format, a top-view plane projection image in the determined format and a top-view depth image in the determined format can be derived from the front-view plane projection image in the determined format and the front-view depth image in the determined format, and they are used for the purpose of further facilitating three-dimensional computations such as separation of the background and the object.

5. For three-dimensional measurement systems, such as a three-dimensional laser scanner and a three-dimensional radar detector, point cloud data measured by such systems contain neither color information nor gray information, however, a depth image in a determined format corresponding to such point cloud data can be obtained directly according to the above-mentioned method or apparatus, also obtaining many benefits described above.

In order to make the above objectives, features and advantages of the present disclosure more apparent and easily understandable, preferred embodiments will be particularly described in detail below with reference to the accompanying drawings.

BRIEF DESCRIPTION OF DRAWINGS

For illustrating technical solutions of embodiments of the present disclosure more clearly, drawings required for the embodiments will be introduced briefly below. It would be understood that the drawings below are merely illustrative of some embodiments of the present disclosure, and therefore should not to be considered as limiting the scope of the present disclosure. For those skilled in the art, other relevant drawings can also be obtained from these drawings, without any inventive effort.

DETAILED DESCRIPTION OF EMBODIMENTS

Figure 1:
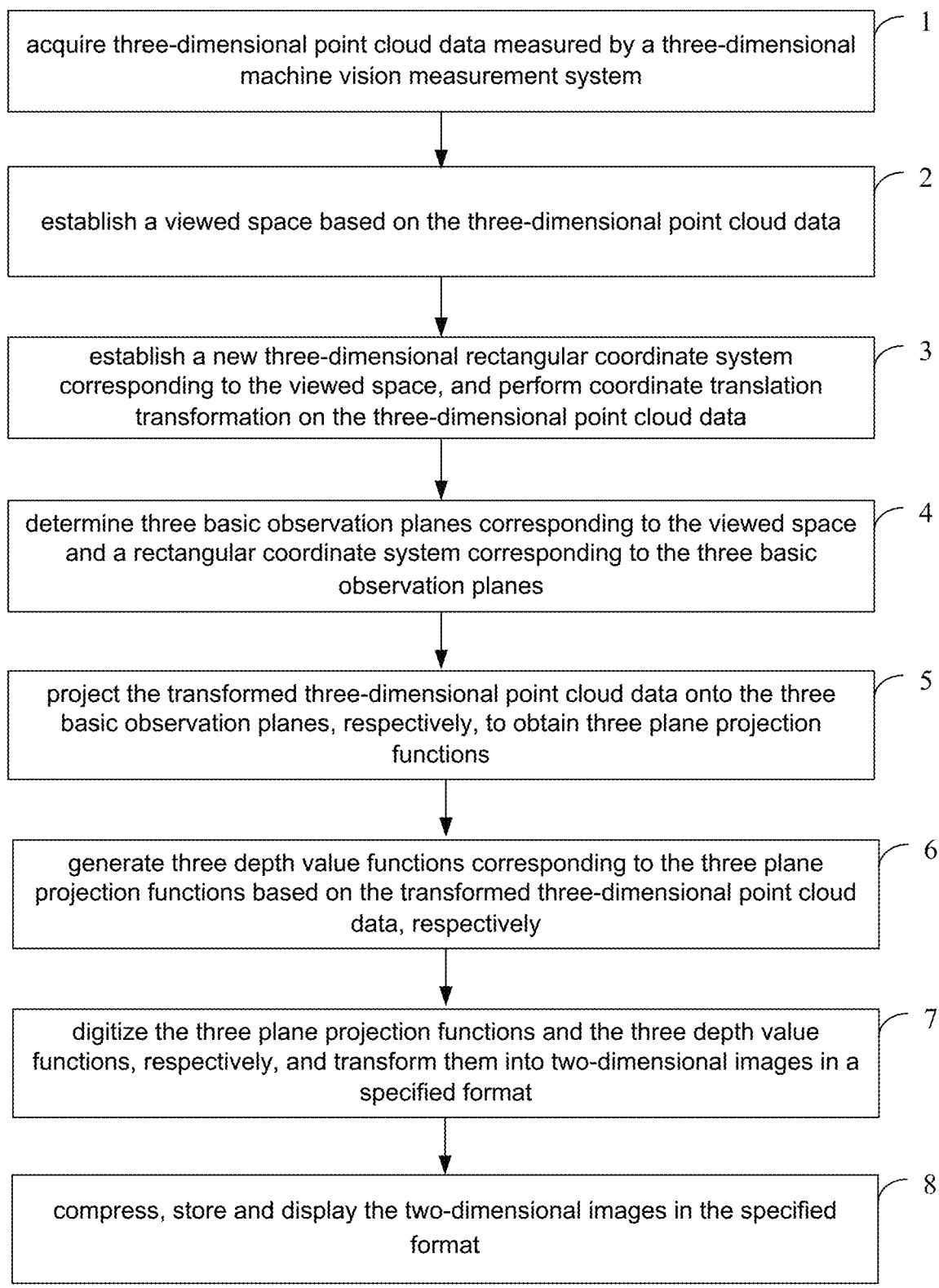
FIG. 1 is a flowchart of a method for processing three-dimensional vision measurement data provided by an embodiment of the present disclosure.

Technical solutions of the embodiments of the present disclosure will be described below clearly and completely with reference to the drawings of the embodiments of the present disclosure. Apparently, the described embodiments are only some but not all of the embodiments of the present disclosure. Thus, the following detailed description of the embodiments of the present disclosure, as represented in the figures, is not intended to limit the scope of protection of the present disclosure, but is merely representative of selected embodiments of the present disclosure. All the other embodiments obtained by those skilled in the art without any inventive effort, in light of the embodiments of the present disclosure, will fall within the scope of protection of the present disclosure.

In the description of the present disclosure, it would be understood that orientation or positional relations indicated by the terms, such as "origin", "center", "longitudinal", "horizontal", "length", "width", "depth" and "height", are based on the orientation or positional relations as shown in the drawings, and these terms are only used to describe the present disclosure and simplify the description, but not used to indicate or imply that the device or element referred to must have a particular orientation or must be constructed or operated in the particular orientation, and therefore should not be construed as limiting the present disclosure.

It should be noted that in the present disclosure, the three-dimensional machine vision measurement system refers to a system capable of measuring spatial position information of a viewed object in space and obtaining three-dimensional coordinates and color information or gray information of a view point on the viewed object, including a known binocular vision three-dimensional measurement system, a four-camera vision three-dimensional measurement system (i.e., the measurement system in Document 1) and the like. Those skilled in the art may obtain three-dimensional point cloud data information by use of a variety of three-dimensional machine vision measurement systems.

As shown in FIG. 1, a flowchart of a method for processing three-dimensional vision measurement data provided by an embodiment of the present disclosure is illustrated. The method includes the following steps:

Step 1: acquiring three-dimensional point cloud data measured by a three-dimensional machine vision measurement system.

Figure 2:
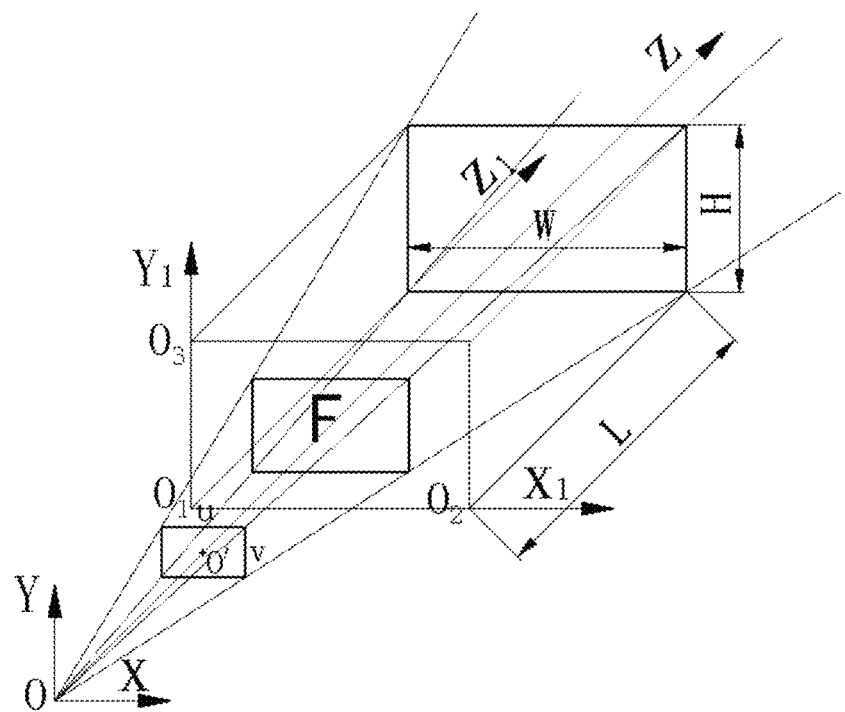
FIG. 2 is a schematic view showing a three-dimensional rectangular coordinate system corresponding to a three-dimensional machine vision measurement system provided by an embodiment of the present disclosure.

As shown in FIG. 2, a schematic view showing a three-dimensional rectangular coordinate system corresponding to a three-dimensional machine vision measurement system provided by an embodiment of the present disclosure is illustrated. Since the three-dimensional machine vision measurement system is a two-dimensional image based measurement system and an image measured by the measurement system meets a pinhole imaging model, the final data measured by the measurement system also comply with law and characteristics of the pinhole imaging model, for example, the distribution of measurement points of an object near the system is closer than the distribution of measurement points of an object distant from the system. Therefore, the three-dimensional machine vision measurement system can be regarded as a set of independent image collection devices. Supposing that the system focuses on point O as a focus point, a measurement result of a single (or one) measurement by the three-dimensional machine vision measurement system corresponds to one two-dimensional measurement plane (or measurement image), the distance between the measurement plane and the focus point O is generally the focal length of the measurement system, and the measurement points or pixel points in the measurement plane has a resolution of u×v, that is, a total number of u×v discrete measurement points or pixel points, having u such points in the width direction and v such points in the height direction, can be obtained in the measurement plane. A basic three-dimensional rectangular coordinate system OXYZ is established with point O as a coordinate origin, where the Z coordinate axis passes through a center O' of the above-mentioned measurement plane. A collection of data of a surface of a viewed object is obtained from the measurement result of the three-dimensional machine vision measurement system. The collection of data corresponds to a discrete multi-curved distributed spatial structure consisting of discrete points and having color information or gray information and spatial position information of the surface of the viewed object, where the multi-curved distributed spatial structure mentioned herein refers to a spatial distribution under more than one viewed object and/or a variety of viewed objects.

$I_{u,v}(i, j)$ is defined as three-dimensional point cloud data measured by a three-dimensional machine vision measurement system, and $I_{uv}(i, j)$ is represented by a collection of spatial three-dimensional coordinates and corresponding color values of points:

$$I_{uv}(i, j) = \sum_{i=0}^{u-1} \sum_{j=0}^{v-1} [x(i, j), y(i, j), z(i, j), R(i, j), G(i, j), B(i, j)]$$

or represented by a collection of spatial three-dimensional coordinates and corresponding gray values of points:

$$I_{uv}(i, j) = \sum_{i=0}^{u-1} \sum_{j=0}^{v-1} [x(i, j), y(i, j), z(i, j), g(i, j)]$$

where u and v are the numbers of measurement points or pixel points in a width direction and a height direction of the two-dimensional measurement plane corresponding to the single measurement by the three-dimensional machine vision measurement system, respectively; i and j represent a position of a measurement point or pixel point in the two-dimensional measurement plane, where $0 \leq i \leq u-1$, $0 \leq j \leq v-1$, and each of i and j is an integer; $x(i, j)$, $y(i, j)$ and $z(i, j)$ are spatial position coordinates of a view point corresponding to the measurement point or pixel point measured by the three-dimensional machine vision measurement system; $R(i, j)$, $G(i, j)$ and $B(i, j)$ are color values of a surface of the view point corresponding to the measurement point or pixel point measured by the three-dimensional machine vision measurement system; and $g(i, j)$ is a gray value of the surface of the view point corresponding to the measurement point or pixel point measured by the three-dimensional machine vision measurement system.

Step 2: establishing a viewed space based on the three-dimensional point cloud data.

Based on the three-dimensional point cloud data obtained by different three-dimensional machine vision measurement systems, a viewed space can be established as a rectangular parallelepiped shown in FIG. 2, which has a depth of L, a width of W and a height of H. Three-dimensional point cloud data of view points, corresponding to the individual measurement points or pixel points of the three-dimensional machine vision measurement system, in the viewed space are obtained by the three-dimensional machine vision measurement system. Such three-dimensional point cloud data of view points are contained in the viewed space, with a front face of the viewed space facing directly the three-dimensional machine vision measurement system and being parallel to the measurement plane of the three-dimensional machine vision measurement system.

For $I_{uv}(i, j)$, the corresponding maximum and minimum values of the three-dimensional point cloud data in three coordinate axes perpendicular to one another can be obtained, respectively, based on the measurement results of the three-dimensional machine vision measurement system; and based on these maximum and minimum values, the viewed space corresponding to the point cloud data from a single measurement of the three-dimensional machine vision measurement system can be defined as follows.

For $I_{uv}(i, j)$, a viewed space with a depth of L, a width of W and a height of H is defined to satisfy the following conditions:

$L = z_{max} - z_{min} + \delta l$, $W = x_{max} - x_{min} + \delta w$, $H = y_{max} - y_{min} + \delta h$, where $z_{max}$ is a maximum depth coordinate in the three-dimensional point cloud data, $z_{min}$ is a minimum depth coordinate in the three-dimensional point cloud data, $x_{max}$ is a maximum width coordinate in the three-dimensional point cloud data, $x_{min}$ is a minimum width coordinate in the three-dimensional point cloud data, $y_{max}$ is a maximum height coordinate in the three-dimensional point cloud data, $y_{min}$ is a minimum height coordinate in the three-dimensional point cloud data, $\delta l$ is a depth adjustment value of the viewed space, $\delta w$ is a width adjustment value of the viewed space, and $\delta h$ is a height adjustment value of the viewed space. The depth adjustment value, the width adjustment value and the height adjustment value of the viewed space are set for the purpose that these adjustment values make the values of W, H and L be slightly larger than the actual size of the viewed object, thereby ensuring the viewed object is contained in the viewed space, and facilitating subsequent computation or processing.

Step 3: establishing a new three-dimensional rectangular coordinate system corresponding to the viewed space, and performing coordinate translation transformation on the three-dimensional point cloud data.

Figure 3:
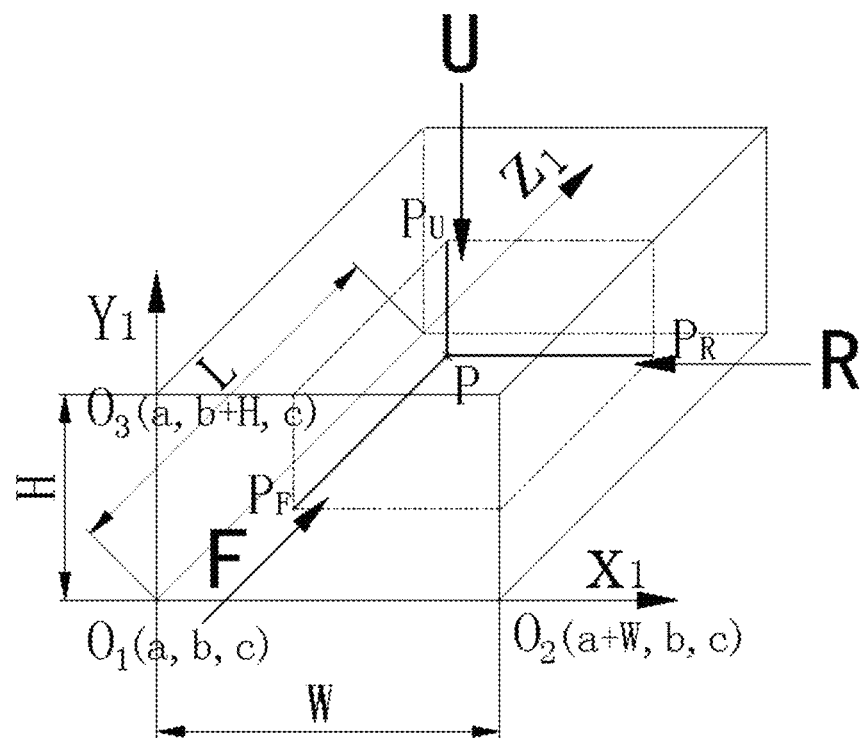
FIG. 3 is a schematic view showing a new three-dimensional rectangular coordinate system and three observation planes corresponding to a viewed space provided by an embodiment of the present disclosure.

As shown in FIG. 3, a schematic view showing a new three-dimensional rectangular coordinate system and three observation planes corresponding to the viewed space provided by an embodiment of the present disclosure is illustrated.

For the above-mentioned viewed space, a new three-dimensional rectangular coordinate system $O_1 X_1 Y_1 Z_1$ is further defined separately, as shown in FIG. 3. In the new three-dimensional rectangular coordinate system, a point $O_1$ corresponding to a lower left corner of a face, facing directly the three-dimensional machine vision measurement system, of the rectangular parallelepiped corresponding to the viewed space is taken as a coordinate origin, which represents a start point for calculating the depth L, the width W and the height H, and which is different from the coordinate origin O corresponding to the three-dimensional machine vision measurement system of FIG. 2. Translation transformation can be performed between the two three-dimensional rectangular coordinate systems corresponding to the two origins by means of a corresponding coordinate transformation matrix. It is supposed that the point $O_1$ of FIG. 3 has coordinates of $O_1(a, b, c)$ in the basic rectangular coordinate system of FIG. 2, where $a = x_{min} + \Delta x$, $b = y_{min} + \Delta y$, $c = z_{min} + \Delta z$, $\Delta x$, $\Delta y$ and $\Delta z$ are an origin width adjustment value, an origin height adjustment value and an origin depth adjustment value, respectively. The above-mentioned adjustment values are set for the purpose of adjusting the size, to leave a certain distance for a part, which needs to be displayed, of the viewed object, and to prevent the view point from being positioned to the most marginal. $J_{uv}(i, j)$ is defined as the transformed three-dimensional point cloud data and is represented by a collection of spatial three-dimensional coordinates and corresponding color values of points:

$$J_{uv}(i, j) = \sum_{i=0}^{u-1} \sum_{j=0}^{v-1} [(x(i, j) - a), (y(i, j) - b), (z(i, j) - c), R(i, j), G(i, j), B(i, j)]$$

or represented by a collection of the spatial three-dimensional coordinates and corresponding gray values:

$$J_{uv}(i, j) = \sum_{i=0}^{u-1} \sum_{j=0}^{v-1} [(x(i, j) - a), (y(i, j) - b), (z(i, j) - c), g(i, j)].$$

Step 4: determining three basic observation planes corresponding to the viewed space and a rectangular coordinate system corresponding to the three basic observation planes.

As shown in FIG. 3, three observation planes, i.e., a front-view observation plane (F), a right-view observation plane (R) and a top-view observation plane (U), are set among the surfaces of the defined viewed space. As shown by arrows in FIG. 3, observation directions for the three observation planes are all directed perpendicularly toward the interior of the viewed space.

Figure 4:
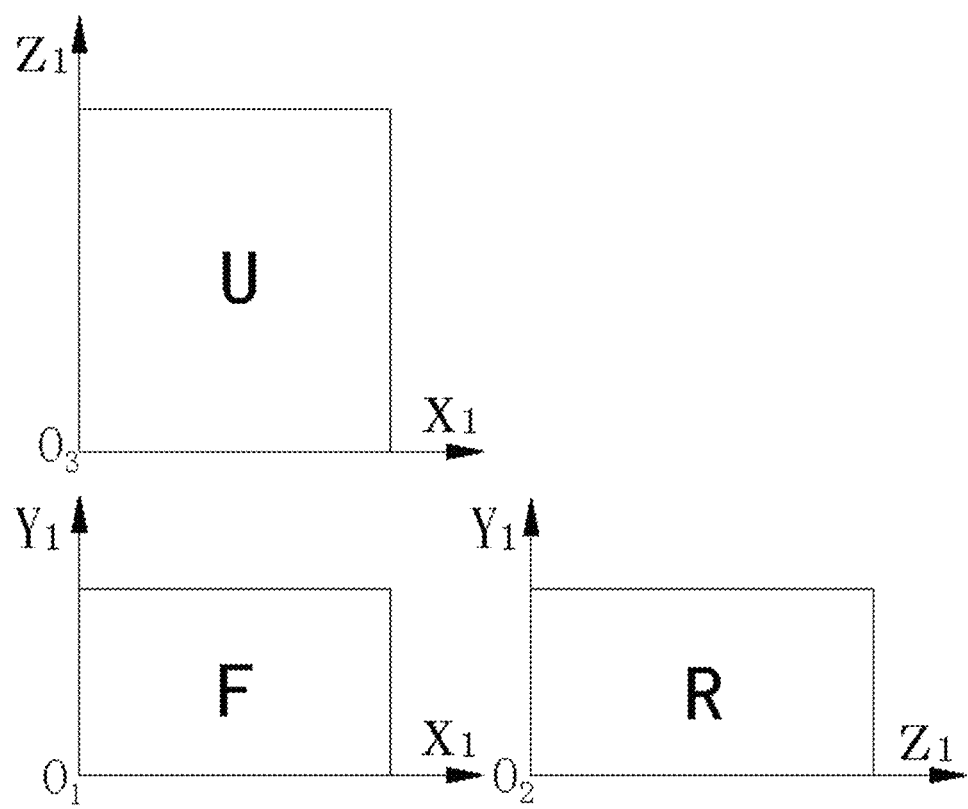
FIG. 4 is a schematic view showing a plane rectangular coordinate system corresponding to the three observation planes of the viewed space provided by an embodiment of the present disclosure.

The three observation planes are sequentially spread out, as shown in FIG. 4, which is a schematic view showing a plane rectangular coordinate system corresponding to the three observation planes provided by an embodiment of the present disclosure.

With reference to FIG. 4, the three observation planes of the viewed space are defined as follows:

the front-view observation plane (F), for which the observation direction is a direction indicated by a $Z_1$-axis arrow, where the front-view observation plane has a coordinate origin located at $O_1(a, b, c)$, an abscissa axis corresponding to the front-view observation plane is an $X_1$ axis, and an ordinate axis corresponding to the front-view observation plane is a $Y_1$ axis;

the right-view observation plane (R), for which the observation direction is a direction opposite to that indicated by an $X_1$-axis arrow, where the right-view observation plane has a coordinate origin located at $O_2(a+W, b, c)$, an abscissa axis corresponding to the right-view observation plane is a $Z_1$ axis, and an ordinate axis corresponding to the right-view observation plane is the $Y_1$ axis; and the top-view observation plane (U), for which the observation direction is a direction opposite to that indicated by a $Y_1$-axis arrow, where the top-view observation plane has a coordinate origin at $O_3(a, b+H, c)$, an abscissa axis corresponding to the top-view observation plane is the $X_1$ axis, and an ordinate axis corresponding to the top-view observation plane is the $Z_1$ axis.

The names of the coordinate axes of the three observation planes, the names of the three-dimensional coordinate axes of the viewed space and the names of the three-dimensional coordinate axes of the three-dimensional machine vision measurement system are consistent with one another, so as to facilitate subsequent computation and understanding.

Step 5: projecting the transformed three-dimensional point cloud data onto the three basic observation planes, respectively, to obtain three plane projection functions.

The data of $J_{uv}(i, j)$ are projected onto the three planes F, R and U, respectively, to obtain three plane projection functions. Data corresponding to these projection functions are the same as results obtained by perpendicularly observing the measured three-dimensional object in the above-mentioned three observation directions, which is exactly the same as the principle of three-view drawings of mechanical drawing.

As shown in FIG. 3, it is given a specific embodiment in which any point $P(x_1, y_1, z_1)$ in the viewed space is projected onto the three observation planes, respectively. Specifically, the point P is projected onto the front-view observation plane F as a point $P_F$, where the point $P_F$ has an abscissa of $x_1$ and an ordinate of $y_1$, and corresponds to a depth value equal to a distance between P and $P_F$, namely $z_1$; the point P is projected onto the right-view observation plane R as a point $P_R$, where the point $P_R$ has an abscissa of $z_1$ and an ordinate of $y_1$, and corresponds to a depth value equal to a distance between P and $P_R$, namely $W-x_1$; and the point P is projected onto the top-view observation plane U as a point $P_U$, where the point $P_U$ has an abscissa of $x_1$ and an ordinate of $z_1$, and corresponds to a depth value equal to a distance between P and $P_U$, namely $H-y_1$.

The following numerical transformations are performed on each point in $J_{uv}(i, j)$.

The projection functions corresponding to the three observation planes are defined as follows:

as to a front-view plane projection function $F(x_1, y_1)$:

if $x_1=x(i, j)-a$ and $y_1=y(i, j)-b$, then $$F(x_1,y_1)=[R(i,j),G(i,j),B(i,j)]$$

or $$F(x_1,y_1)=g(i,j)$$

where $0 \leq x_1 \leq W$ and $0 \leq y_1 \leq H$ are met for $F(x_1, y_1)$;

as to a right-view plane projection function $R(z_1, y_1)$:

if $z_1=z(i, j)-c$ and $y_1=y(i, j)-b$, then $$R(z_1,y_1)=[R(i,j),G(i,j),B(i,j)]$$

or $$R(z_1,y_1)=g(i,j)$$

where $0 \leq x_1 \leq L$ and $0 \leq y_1 9 \leq H$ are met for $R(z_1,y_1)$; and as to a top-view plane projection function $U(x_1, z_1)$:

if $x_1=x(i, j)-a$ and $z_1=z(i, j)-c$, then $$U(x_1,z_1)=[R(i,j),G(i,j),B(i,j)]$$

or $$U(x_1,z_1)=g(i,j)$$

where $0 \leq z_1 \leq W$ and $0 \leq z_1 \leq L$ are met for $U(x_1,z_1)$.

Step 6: generating three depth value functions corresponding to the three plane projection functions based on the transformed three-dimensional point cloud data, respectively.

The data of $J_{uv}(i, j)$ are projected perpendicularly onto the three observation planes F, R and U, respectively. In this case, the projected image may represent the planar projection size of the viewed object, but the depth value is lost, which makes it inconvenient to perform correlation computation on the three projection functions during the calculation of the three-dimensional information. For this reason, it is also necessary to generate corresponding depth value functions, in addition to generating the plane projection functions for the measured data. The depth value function may be in a form of pseudo color, so that a pseudo color image of the depth value can be generated when there is a need to display. In order to be distinguished from the plane projection functions, three depth value functions are defined, which are a front-view depth value function $FS(x_1, y_1)$, a right-view depth value function $RS(z_1, y_1)$ and a top-view depth value function $US(x_1, z_1)$, respectively. The three depth value functions have various parameters therein defined in a same manner as those of the corresponding plane projection functions, and they are generated as follows:

The following numerical transformations are performed on each point in $J_{uv}(i, j)$:
as to the front-view depth value function:
if $x_1=x(i, j)-a$ and $y_1=y(i, j)-b$, then $$FS(x_1, y_1) = z_1 = z(i, j) - c$$

where $0 \le x_1 \le W$ and $0 \le y_1 \le H$ are met for $FS(x_1, y_1)$;
as to the right-view depth value function $RS(z_1, y_1)$;
if $z_1=z(i, j)-c$ and $y_1=y(i, j)-b$, then $$RS(z_1, y_1) = W - x_1 = W - (x(i, j) - a)$$

where $0 \le z_1 \le L$ and $0 \le y_1 \le H$ are met for $RS(z_1, y_1)$; and
as to the top-view depth value function $US(x_1, z_1)$;
if $x_1=x(i, j)-a$ and $z_1=z(i, j)-c$, then $$US(x_1, z_1) = H - y_1 = H - (y(i, j) - b)$$

where $0 \le x_1 \le W$ and $0 \le z_1 \le L$ are met for $US(x_1, z_1)$.

Step 7: digitizing the three plane projection functions and the three depth value functions, respectively, and transforming them into two-dimensional images in a determined format.

For facilitating the storage and displaying, each of the front-view plane projection function, the right-view plane projection function, the top-view plane projection function, the front-view depth value function, the right-view depth value function and the top-view depth value function is transformed into a two-dimensional image in a determined format having u×v pixel points. The two-dimensional images in the determined format corresponding to the individual functions are represented as a front-view plane projection image FT in the determined format, a right-view plane projection image RT in the determined format, a top-view plane projection image UT in the determined format, a front-view depth image FST in the determined format, a right-view depth image RST in the determined format and a top-view depth image UST in the determined format.

Resolutions of the two-dimensional images requiring to be stored are defined according to the image measurement accuracy and the requirement for clear display. If the three-dimensional machine vision measurement system has a measurement resolution of u×v, the resolution of each of the two-dimensional images in the determined format is set to be u×v.

The following are pixel sizes of the two-dimensional images in the determined format, respectively:
with pixel sizes corresponding to the FT image and the FST image being:

$$\mu_{xF} = \frac{W}{u}; \mu_{yF} = \frac{H}{v}$$

with pixel sizes corresponding to the RT image and the RST image being:

$$\mu_{zR} = \frac{L}{u}; \mu_{yR} = \frac{H}{v}$$

with pixel sizes corresponding to the UT image and the UST image being:

$$\mu_{xU} = \frac{W}{u}; \mu_{zU} = \frac{L}{v}$$

where $\mu_{xF}$ and $\mu_{yF}$ are pixel size of the FT image and the FST image in the width direction and in the height direction respectively, $\mu_{zR}$ and $\mu_{yR}$ are pixel sizes of the RT image and the RST image in the width direction and in the height direction respectively, and $\mu_{xU}$ and $\mu_{zU}$ are pixel sizes of the UT image and the UST image in the width direction and in the height direction respectively; where after computation of the pixel size, a computed result is obtained to be used as a final pixel size, with digits of a fixed number of the computed result determined as significant digits according to image measurement range and accuracy requirements, where the last digit is determined by a rounding-off method, so as to facilitate post processing and computation of the image.

Meanwhile, all of the following computation processes for generating the two-dimensional images in the determined format involve transforming the three-dimensional coordinate values measured by the three-dimensional machine vision measurement system into coordinate values corresponding to the pixel points of the two-dimensional images in the determined format. During the transformation between the two coordinate values, it is necessary to convert real numbers into specified discrete positive integers, and there is a problem of rounding operation in the conversion. Since there are different accuracy requirements for different measured data, correlation operation is not taken into consideration here. Omission of relevant operations relating to the rounding and significant digits and of symbols related therewith from formulas does not affect the understanding of the following formulas, and thus relevant mathematical operation symbols are omitted from the expressions of the following formulas.

After the pixel sizes are determined, each of the front-view plane projection function, the right-view plane projection function, the top-view plane projection function, the front-view depth value function, the right-view depth value function and the top-view depth value function is converted into a two-dimensional image in a determined format having u×v pixel points, and coordinates of the pixel points are digitized in a format of u×v. In the following computations, coordinates i or j of the pixel points, when being decimals, each are rounded to a positive integer no more than u or v.

The FT image is generated by the following process:
for the individual data in the front-view plane projection function $F(x_1, y_1)$:
supposing $$i = \frac{x_1}{\mu_{xF}} \text{ and } j = \frac{y_1}{\mu_{yF}}, \text{ then}$$

$$FT(i, j) = F(x_1, y_1)$$

$$FT_{uv}(i, j) = \sum_{i=0}^{u-1}\sum_{j=0}^{v-1}[FT(i, j)].$$

The RT image is generated by the following process:
for the individual data in the right-view plane projection function $R(z_1,y_1)$:
assuming $$i = \frac{z_1}{\mu_{zR}} \text{ and } j = \frac{y_1}{\mu_{yR}}, \text{ then}$$

$$RT(i, j) = R(z_1, y_1)$$

$$RT_{uv}(i, j) = \sum_{i=0}^{u-1}\sum_{j=0}^{v-1}[RT(i, j)].$$

The UT image is generated by the following process:
for the individual data in the top-view plane projection function $U(x_1, z_1)$:
assuming $$i = \frac{x_1}{\mu_{xU}} \text{ and } j = \frac{z_1}{\mu_{zU}}, \text{ then}$$

$$UT(i, j) = U(x_1, z_1)$$

$$UT_{uv}(i, j) = \sum_{i=0}^{u-1}\sum_{j=0}^{v-1}[UT(i, j)].$$

When generating the depth images in the determined format, it is necessary to digitize depth values according to a certain number of 0 to N−1 (e.g., 256) of gray values, where N is the number of the gray values. Taking 0 to 255 gray values as an example, in the following computations, depth values, when being decimals, each are rounded to a positive integer no more than 255.

The FST image is generated by the following process:
for the individual data in the front-view depth value function $FS(x_1, y_1)$:
assuming $$i = \frac{x_1}{\mu_{xF}} \text{ and } j = \frac{y_1}{\mu_{yF}}, \text{ then}$$

$$FST(i, j) = \frac{FS(x_1, y_1)}{L} \times 255$$

$$FST_{uv}(i, j) = \sum_{i=0}^{u-1}\sum_{j=0}^{v-1}[FST(i, j)].$$

The RST image is generated by the following process:
for the individual data in the right-view depth value function $RS(z_1, y_1)$:
assuming $$i = \frac{z_1}{\mu_{zR}} \text{ and } j = \frac{y_1}{\mu_{yR}}, \text{ then}$$

$$RST(i, j) = \frac{RS(z_1, y_1)}{W} \times 255$$

$$RST_{uv}(i, j) = \sum_{i=0}^{u-1}\sum_{j=0}^{v-1}[RST(i, j)].$$

The UST image is generated by the following process:
for the individual data in the top-view depth value function $US(x_1, z_1)$:
assuming $$i = \frac{x_1}{\mu_{xU}} \text{ and } j = \frac{z_1}{\mu_{zU}}, \text{ then}$$

$$UST(i, j) = \frac{US(x_1, z_1)}{H} \times 255$$

$$UST_{uv}(i, j) = \sum_{i=0}^{u-1}\sum_{j=0}^{v-1}[UST(i, j)].$$

A set of three-dimensional point cloud data obtained by the three-dimensional machine vision measurement system can be converted into six two-dimensional images through the above coordinate transformation. However, after the conversion is finished, the u×v pixel points in each two-dimensional image in the determined format may not all have a corresponding pixel value. Therefore, it is possible to assign initial values to all the pixel points of the two-dimensional images before the generation of the six images, and then assign the calculated pixel values, so that the assigned initial value is reserved for the pixel point having a calculated pixel value being null. For gray values, the initial value is generally selected to be 0 or N−1 (e.g., 255); and for color values, black, white or other colors can be selected as the initial value, and these initial values can be regarded as a background gray or background color of the pixel points having the calculated pixel values being non-null.

In addition, since pinhole imaging has a problem of having high density in the vicinity and low density in the distance, there will also be a problem that multiple view points in the vicinity, after the digitalization, may correspond to the same pixel point. After the processing in accordance with the above steps, the finally assigned value will override the previously assigned value and serve as a final pixel value. The occurrence of this case means that the measurement resolution of nearby objects is reduced. If a higher resolution is required, then before each of the two-dimensional images in the determined format is generated, the resolution u×v of the image can be scaled up or similarly can also be scaled down, in order not to lose measurement accuracy. The two-dimensional images with different measurement resolutions can be obtained by performing the above operations according to the above steps.

Further, since the problem of uniformity of display scales in different directions of the image is not taken into account in the calculation of the pixel sizes in the width, height, and depth directions, uniformization processing can further be performed by increasing or decreasing the adjustment values δl, δw and δh, in order to equalize the pixel sizes in different directions to achieve the uniformity of the display scales in different directions.

Finally, the pixel coordinates and pixel values of the six two-dimensional images are described as follows:
as to the front-view plane projection image in the determined format—FT:

$$FT_{uv}(i, j) = \sum_{i=0}^{u-1} \sum_{j=0}^{v-1} [FT(i, j)];$$

as to the right-view plane projection image in the determined format—RT:

$$RT_{uv}(i, j) = \sum_{i=0}^{u-1} \sum_{j=0}^{v-1} [RT(i, j)];$$

as to the top-view plane projection image in the determined format—UT:

$$UT_{uv}(i, j) = \sum_{i=0}^{u-1} \sum_{j=0}^{v-1} [UT(i, j)];$$

as to the front-view depth image in the determined format—FST:

$$FST_{uv}(i, j) = \sum_{i=0}^{u-1} \sum_{j=0}^{v-1} [FST(i, j)];$$

as to the right-view depth image in the determined format—RST:

$$RST_{uv}(i, j) = \sum_{i=0}^{u-1} \sum_{j=0}^{v-1} [RST(i, j)];$$

and as to the top-view depth image in the determined format—UST:

$$UST_{uv}(i, j) = \sum_{i=0}^{u-1} \sum_{j=0}^{v-1} [UST(i, j)].$$

In the embodiment of the present disclosure, the six two-dimensional images in the determined format can be generated in accordance with the coordinates of the pixel points and the color values or gray values corresponding to the points as described in the above-mentioned formulas. The generated images can be stored, compressed or displayed directly, or the generated images may be subjected to operations, such as storage, compression or display, after being converted into an appropriate image format. The image formats available for the conversion include but not limited to image formats of BMP, JIF, JPEG, JPEG2000, TIFF, PSD, PNG, SWF and SVG.

Figure 5:
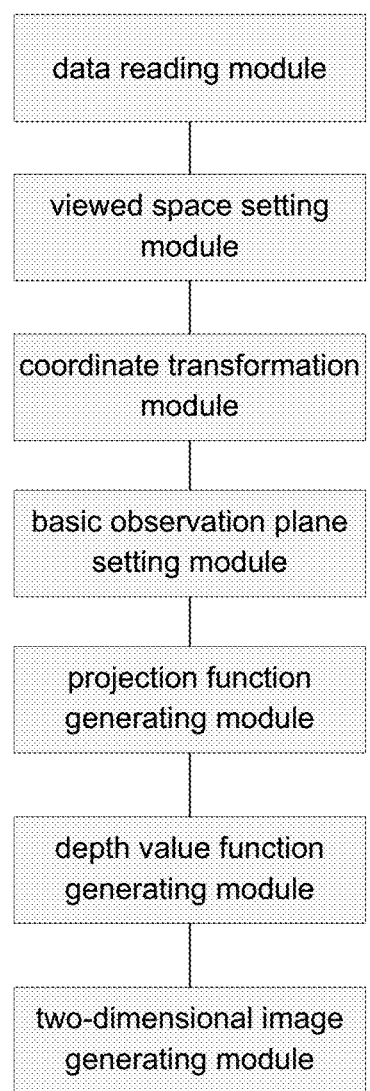
FIG. 5 is a structural schematic view of an apparatus for processing three-dimensional vision measurement data provided by an embodiment of the present disclosure.

As shown in FIG. 5, an embodiment of the present disclosure provides an apparatus for processing three-dimensional vision measurement data, adapted to perform the above-mentioned method. The apparatus includes:

a data reading module, configured to acquire three-dimensional point cloud data measured by a three-dimensional machine vision measurement system;
specifically, the data reading module is configured to establish a basic three-dimensional rectangular coordinate system OXYZ based on the three-dimensional machine vision measurement system, where the three-dimensional point cloud data are defined in a same manner as that in the above-mentioned method;

a viewed space setting module, configured to establish a viewed space based on the three-dimensional point cloud data;
specifically, the viewed space setting module is configured to form the viewed space into a rectangular parallelepiped with a depth of L, a width of W and a height of H, based on the three-dimensional point cloud data, where various parameters are defined in a same manner as those in the above-mentioned method;

a coordinate transformation module, configured to establish a new three-dimensional rectangular coordinate system corresponding to the viewed space, and perform coordinate translation transformation on the three-dimensional point cloud data;
specifically, the coordinate transformation module is configured to establish a new three-dimensional rectangular coordinate system $O_1X_1Y_1Z_1$, with the new three-dimensional rectangular coordinate system taking a point $O_1$ at a lower left corner of a face, facing directly the three-dimensional machine vision measurement system, of the rectangular parallelepiped corresponding to the viewed space as a coordinate origin; and in a case that coordinates of $O_1$ in the basic three-dimensional rectangular coordinate system OXYZ are represented by (a, b, c), perform coordinate translation transformation on the three-dimensional point cloud data, to obtain transformed three-dimensional point cloud data represented by $J_{uv}(i, j)$, where $J_{uv}(i, j)$ is defined in a same manner as that in the above-mentioned method;

a basic observation plane setting module, configured to determine three basic observation planes corresponding the viewed space and a rectangular coordinate system corresponding to the three basic observation planes;
specifically, the basic observation plane setting module is configured to determine three basic observation planes corresponding the viewed space and a rectangular coordinate system corresponding to the three basic observation planes, where the three basic observation planes and the rectangular coordinate system corresponding to the observation planes are defined in a same manner as those in the above-mentioned method;

a projection function generating module, configured to project the transformed three-dimensional point cloud data onto the three basic observation planes, respectively, to obtain three plane projection functions;
specifically, the projection function generating module is configured to project the transformed three-dimensional point cloud data onto the three basic observation planes, respectively, and performing coordinate value transformation, to obtain form the projection a front-view plane projection function represented by $[F(x_1, y_1), 0 \leq x_1 \leq W, 0 \leq y_1 \leq H]$, a right-view plane projection function represented by $[R(z_1, y_1), 0 \leq z_1 \leq L, 0 \leq y_1 \leq H]$ and a top-view plane projection function represented by $[U(x_1, z_1), 0 \leq x_1 \leq W, 0 \leq z_1 \leq L]$, where $F(x_1, y_1)$, $R(z_1, y_1)$ and $U(x_1, z_1)$ are generated by the same processes as those in the above-mentioned method;

a depth value function generating module, configured to generate three depth value functions corresponding to the three plane projection functions based on the transformed three-dimensional point cloud data, respectively;
specifically, the depth value function generating module is configured to generate, based on the transformed three-dimensional point cloud data, three depth value functions corresponding to the three plane projection functions, respectively, which are a front-view depth value function represented by [$FS(x_1, y_1)$, $0 \leq x_1 \leq W$, $0 \leq y_1 \leq H$], a right-view depth value function represented by [$RS(z_1, y_1)$, $0 \leq z_1 \leq L$, $0 \leq y_1 \leq H$] and a top-view depth value function represented by [$US(x_1, z_1)$, $0 \leq x_1 \leq W$, $0 \leq z_1 \leq L$];

where $FS(x_1)$, $RS(z_1, y_1)$ and $US(x_1, z_1)$ are generated by the same processes as those in the above-mentioned method.

a two-dimensional image generating module, configured to digitize the three plane projection functions and the three depth value functions, respectively, and transform them into two-dimensional images in a determined format;

specifically, the two-dimensional image generating module is configured to perform the corresponding steps of generating the two-dimensional images in the determined format as defined in the above-mentioned method.

In addition, the above-mentioned apparatus further includes a compression module (not shown), a storage module (not shown) and a display module (not shown), configured to perform compression, storage and display operations on the generated two-dimensional images, respectively.

The method and apparatus provided by the present disclosure restore the three-dimensional point cloud data collected at a time by the three-dimensional machine vision measurement system onto rectangular coordinate planes perpendicular to one another, to obtain six two-dimensional images FT, RT, UT, FST, RST and UST, in which the three-dimensional information of the measured space is completely expressed, to make the description of the three-dimensional space intuitive and easily understandable; from the individual two-dimensional images, the three-dimensional size and spatial position of a viewed object can be obtained, and the gray value or color value information of any point can be obtained, which is convenient for subsequent use by machine intelligence; and moreover, various processing and computations, such as stitching, compression and storage, can be performed on the six images by use of the prior two-dimensional image processing technology, so that the operational data are called quickly and conveniently, the computation speed is significantly accelerated, and the occupied storage space is reduced.

Unlike the prior two-dimensional images, the FT, RT, UT, FST, RST and UST images do not follow the principle of perspective, the position of any pixel point in each of the images uniquely corresponds to an actual spatial position of a view point corresponding to the pixel point, and the spatial position coordinates of a view point corresponding to each pixel point in all the images can be obtained by combining the FT, RT, UT, FST, RST and UST images. During computation of other positions and sizes, a corresponding distance between the individual pixel points can be obtained by directly calculating the number of points by which the individual pixel points are spaced and then multiplying the same by the pixel size.

The method and apparatus of the present disclosure are suitable for processing results obtained from a single measurement by the three-dimensional machine vision measurement system, and then storing and displaying them. When the same measurement system carries out continuous measurements, two-dimensional images in a determined format which are continuous over time can be obtained; and if the measured two-dimensional images are displayed continuously, a continuous three-dimensional vision is achieved, generating a dynamic effect like a movie. Three-dimensional data or images corresponding to a viewed object can be measured from multiple angles, by moving or rotating the viewed object; and different sides of the same viewed object can be reflected from different angles, if the measurement system is moved.

For storage of the measurement data, only a front-view plane projection image in the determined format and a front-view depth image in the determined format are needed for completely storing data from a single measurement. A right-view plane projection image in the determined format, a right-view depth image in the determined format, a top-view plane projection image in the determined format and a top-view depth image in the determined format can be derived from the front-view plane projection image in the determined format and the front-view depth image in the determined format, and they are used for the purpose of further facilitating three-dimensional computations such as separation of the background and the object.

For three-dimensional measurement systems, such as a three-dimensional laser scanner and a three-dimensional radar detector, point cloud data measured by such systems contain neither color information nor gray information, however, a depth image in a determined format corresponding to such point cloud data can be obtained directly according to the above-mentioned method or apparatus, also obtaining many benefits described above.

It should be understood that, in the embodiments provided herein, the disclosed method and apparatus may be implemented in other ways. The apparatus embodiment described above is merely illustrative in nature. For example, the division of the units is only a division of logical functions, and additional division modes may be adopted in practical implementation. For another example, multiple units or components may be combined or integrated into another system, or some features may be omitted or not executed. In addition, the mutual coupling, or direct coupling or communication connection illustrated or discussed herein may be implemented through indirect coupling or communication connection between some communication interfaces, apparatuses or units, which may be electronic, mechanical or in other forms.

The units described as separate components may be separated physically or not, and the components illustrated as units may be physical units or not, namely, they may be located at one place or may also be distributed onto multiple network units. Some or all of the units may be selected as actually required to fulfill the objectives of the technical solutions of the present embodiments. Besides, the individual functional units in each embodiment of the present disclosure may be integrated into one processing unit, or may be physically stand-alone, or two or more of the units may be integrated into one unit.

When being implemented in the form of a software functional unit and sold or used as a stand-alone product, the functions may be stored in a computer-readable storage medium. Based on such understanding, the technical solution of the present disclosure in essence, or a part thereof contributing to the prior art, or any part of the technical solution, may be embodied in the form of a software product. The computer software product is stored in a storage medium, and incorporates several instructions for allowing a computer device (which may be personal computer, server, network device or the like) to execute all or some of the steps of the method described in each embodiment of the present disclosure. The aforesaid storage medium includes various media capable of storing program codes, such as a USB flash disk, a mobile hard disk, a read-only memory, a random access memory, a magnetic disk or an optical disk.

The above description is merely illustrative of particular embodiments of the present disclosure, but not intended to limit the scope of protection of the present disclosure. Any modifications or alternations, that would readily occur to those skilled in the art without departing from the technical scope disclosed in the present disclosure, shall fall within the scope of protection of the present disclosure. Therefore, the scope of protection of the present disclosure is subject to the appended claims.

The invention claimed is:

1. A method for processing three-dimensional vision measurement data, comprising:
   step 1, acquiring three-dimensional point cloud data measured by a three-dimensional machine vision measurement system, wherein images measured by the three-dimensional machine vision measurement system meet a pinhole imaging model, the three-dimensional machine vision measurement system refers to a system capable of measuring spatial position information of a viewed object in space and obtaining three-dimensional coordinates and color information or gray information of a view point on the viewed object, including a binocular vision three-dimensional measurement system and a four-camera vision three-dimensional measurement system;
   step 2, establishing a viewed space based on the three-dimensional point cloud data;
   step 3, establishing a new three-dimensional rectangular coordinate system corresponding to the viewed space, and performing coordinate translation transformation on the three-dimensional point cloud data;
   step 4, determining three basic observation planes corresponding to the viewed space, and a rectangular coordinate system corresponding to the three basic observation planes;
   step 5, projecting the transformed three-dimensional point cloud data onto the three basic observation planes, respectively, to obtain three plane projection functions;
   step 6, generating three depth value functions corresponding to the three plane projection functions based on the transformed three-dimensional point cloud data, respectively;
   step 7, digitizing the three plane projection functions and the three depth value functions, respectively, and transforming them into two-dimensional images in a determined format, to obtain three plane projection images and three depth images; and
   step 8, compressing, storing and displaying the three plane projection images and the three depth images.

2. The method according to claim 1, wherein the step 1 comprises: establishing a basic three-dimensional rectangular coordinate system OXYZ based on the three-dimensional machine vision measurement system, with the three-dimensional point cloud data represented by $I_{uv}(i, j)$, wherein $$I_{uv}(i, j) = \sum_{i=0}^{u-1}\sum_{j=0}^{v-1}[x(i, j), y(i, j), z(i, j), R(i, j), G(i, j), B(i, j)] \text{ or}$$

$$I_{uv}(i, j) = \sum_{i=0}^{u-1}\sum_{j=0}^{v-1}[x(i, j), y(i, j), z(i, j), g(i, j)]$$

where the three-dimensional point cloud data are a collection of data of a surface of a viewed object that is obtained from a measurement result of a single measurement by the three-dimensional machine vision measurement system, the collection of data corresponds to a multi-curved distributed spatial structure consisting of discrete points; u and v are the numbers of measurement points or pixel points in a width direction and a height direction of a two-dimensional measurement plane corresponding to the single measurement by the three-dimensional machine vision measurement system, respectively; i and j represent a position of a measurement point or pixel point in the two-dimensional measurement plane, where $0 \le i \le u-1$, $0 \le j \le v-1$, and each of i and j is an integer; $x(i, j)$, $y(i, j)$ and $z(i, j)$ are spatial position coordinates of a view point corresponding to the measurement point or pixel point measured by the three-dimensional machine vision measurement system; $R(i, j)$, $G(i, j)$ and $B(i, j)$ are color values of a surface of the view point corresponding to the measurement point or pixel point measured by the three-dimensional machine vision measurement system; and $g(i, j)$ is a gray value of the surface of the view point corresponding to the measurement point or pixel point measured by the three-dimensional machine vision measurement system.

3. The method according to claim 2, wherein the step 2 comprises: making the viewed space form a rectangular parallelepiped with a depth of L, a width of W and a height of H, based on the three-dimensional point cloud data, wherein $$L = z_{max} - z_{min} + \delta l,$$

$$W = x_{max} - x_{min} + \delta w,$$

$$H = y_{max} - y_{min} \delta h,$$

where $z_{max}$ is a maximum depth coordinate in the three-dimensional point cloud data, $z_{min}$ is a minimum depth coordinate in the three-dimensional point cloud data, $x_{max}$ is a maximum width coordinate in the three-dimensional point cloud data, $x_{min}$ is a minimum width coordinate in the three-dimensional point cloud data, $y_{max}$ is a maximum height coordinate in the three-dimensional point cloud data, $y_{min}$ is a minimum height coordinate in the three-dimensional point cloud data, $\delta l$ is a depth adjustment value of the viewed space, $\delta w$ is a width adjustment value of the viewed space, and $\delta h$ is a height adjustment value of the viewed space.

4. The method according to claim 3, wherein the step 3 comprises: establishing a new three-dimensional rectangular coordinate system $O_1X_1Y_1Z_1$, with the new three-dimensional rectangular coordinate system taking a point $O_1$ at a lower left corner of a face, facing directly the three-dimensional machine vision measurement system, of the rectangular parallelepiped corresponding to the viewed space as a coordinate origin; and in a case that coordinates of $O_1$ in the basic three-dimensional rectangular coordinate system OXYZ are represented by (a, b, c), performing coordinate translation transformation on the three-dimensional point cloud data, to obtain the transformed three-dimensional point cloud data represented by $J_{uv}(i, j)$, wherein $$J_{uv}(i, j) = \sum_{i=0}^{u-1}\sum_{j=0}^{v-1}[(x(i, j) - a), (y(i, j) - b), (z(i, j) - c), R(i, j), G(I, j), B(i, j)]$$

or $$J_{uv}(i, j) = \sum_{i=0}^{u-1}\sum_{j=0}^{v-1}[(x(i, j) - a), (y(i, j) - b), (z(i, j) - c), g(i, j)].$$

5. The method according to claim 4, wherein the determining three basic observation planes corresponding to the viewed space in the step 4 comprises determining:
   a front-view observation plane (F), for which an observation direction is a direction indicated by a $Z_1$-axis arrow, wherein the front-view observation plane has a coordinate origin located at $O_1$, an abscissa axis corresponding to the front-view observation plane is an $X_1$ axis, and an ordinate axis corresponding to the front-view observation plane is a $Y_1$ axis;
   a right-view observation plane (R), for which the observation direction is a direction opposite to that indicated by an $X_1$-axis arrow, wherein the right-view observation plane has a coordinate origin located at $O_2$, an abscissa axis corresponding to the right-view observation plane is a $Z_1$ axis, and an ordinate axis corresponding to the right-view observation plane is the $Y_1$ axis; and
   a top-view observation plane (U), for which the observation direction is a direction opposite to that indicated by a $Y_1$-axis arrow, wherein the top-view observation plane has a coordinate origin located at $O_3$, an abscissa axis corresponding to the top-view observation plane is the $X_1$ axis, and an ordinate axis corresponding to the top-view observation plane is the $Z_1$ axis.

6. The method according to claim 5, wherein the step 5 comprises: projecting the transformed three-dimensional point cloud data onto the three basic observation planes, respectively, and performing coordinate value transformation, to obtain from the projection a front-view plane projection function represented by [$F(x_1, y_1)$, $0 \le x_1 \le W$, $0 \le y_1 \le H$], a right-view plane projection function represented by [$R(z_1, y_1)$, $0 \le z_1 \le L$, $0 \le y_1 \le H$] and a top-view plane projection function represented by [$U(x_1, z_1)$, $0 \le x_1 \le W$, $0 \le z_1 \le L$], wherein for $J_{uv}(i, j)$,
   as to the front-view plane projection function $F(x_1, y_1)$:
      if $x_1 = x(i, j)-a$ and $y_1 = y(i, j)-b$, then
      $F(x_1, y_1) = [R(i,j), G(i,j), B(i,j)]$
      or
      $F(x_1, y_1) = g(i,j)$,
   as to the right-view plane projection function $R(z_1, y_1)$:
      if $z_1 = z(i, j)-c$ and $y_1 = y(i, j)-b$, then
      $R(z_1, y_1) = [R(i,j), G(i,j), B(i,j)]$
      or
      $R(z_1, y_1) = g(i,j)$,
   as to the top-view plane projection function $U(x_1, z_1)$:
      if $x_1 = x(i, j)-a$ and $z_1 = z(i, j)-c$, then
      $U(x_1, z_1) = [R(i,j), G(i,j), B(i,j)]$
      or
      $U(x_1, z_1) = g(i,j)$.

7. The method according to claim 6, wherein in the step 6, the generating three depth value functions corresponding to the three plane projection functions based on the transformed three-dimensional point cloud data respectively, comprises generating a front-view depth value function represented by [$FS(x_1, y_1)$, $0 \le x_1 \le W$, $0 \le y_1 \le H$], a right-view depth value function represented by [$RS(z_1, y_1)$, $0 \le z_1 \le L$, $0 \le y_1 \le H$] and a top-view depth value function represented by [$US(x_1, z_1)$, $0 \le x_1 \le W$, $0 \le z_1 \le L$], wherein for $J_{uv}(i, j)$, the above depth value functions are generated:
   as to the front-view depth value function:
      let $x_1 = x(i, j)-a$ and $y_1 = y(i, j)-b$, then $$FS(x_1, y_1) = z_1 = z(i, j) - c$$

as to the right-view depth value function:
      let $z_1 = z(i, j)-c$ and $y_1 = y(i, j)-b$, then $$RS(z_1, y_1) = W - x_1 = W - (x(i, j) - a)$$

as to the top-view depth value function:
      let $x_1 = x(i, j)-a$ and $z_1 = z(i, j)-c$, then $$US(x_1, z_1) = H - y_1 = H - (y(i, j) - b).$$

8. The method according to claim 7, wherein the step 7 comprises: transforming each of the front-view plane projection function, the right-view plane projection function, the top-view plane projection function, the front-view depth value function, the right-view depth value function and the top-view depth value function into a two-dimensional image in a determined format having u×v pixel points, with the two-dimensional images in the determined format corresponding to the individual functions represented as a front-view plane projection image FT in the determined format, a right-view plane projection image RT in the determined format, a top-view plane projection image UT in the determined format, a front-view depth image FST in the determined format, a right-view depth image RST in the determined format and a top-view depth image UST in the determined format, respectively;
   firstly, determining pixel sizes of the two-dimensional images in the determined format respectively,
      with pixel sizes corresponding to the FT image and the FST image determined as:

$$\mu_{xF} = \frac{W}{u}; \mu_{yF} = \frac{H}{v},$$

with pixel sizes corresponding to the RT image and the RST image determined as:

$$\mu_{zR} = \frac{L}{u}; \mu_{yR} = \frac{H}{v},$$

with pixel sizes corresponding to the UT image and the UST image determined as:

$$\mu_{xU} = \frac{W}{u}; \mu_{zU} = \frac{L}{v}$$

where $\mu_{xF}$ and $\mu_{yF}$ are pixel sizes of the FT image and the FST image in the width direction and in the height direction respectively, $\mu_{zR}$ and $\mu_{yR}$ are pixel sizes of the RT image and the RST image in the width direction and in the height direction respectively, and $\mu_{xU}$ and $\mu_{zU}$ are pixel sizes of a pixel of the UT image and the UST image in the width direction and in the height direction respectively; wherein after computation of the pixel size, a computed result is obtained to be used as a final pixel size, with digits of a fixed number of the computed result determined as significant digits according to image measurement range and accuracy requirements, wherein the last digit is determined by a rounding-off method, so as to facilitate post processing and computation of the image;

digitizing coordinates of the pixel points in a format of u×v after the pixel sizes are determined, wherein in the following computations, coordinates i and/or j of the pixel points, when being decimals, each are rounded to a positive integer no more than u and/or v, so as to for $J_{uv}(i, j)$ generate:

the front-view plane projection image (FT) in the determined format as follows:
supposing $$i = \frac{x_1}{\mu_{xF}} \text{ and } j = \frac{y_1}{\mu_{yF}}, \text{ then}$$

$$FT(i, j) = F(x_1, y_1)$$

$$FT_{uv}(i, j) = \sum_{i=0}^{u-1} \sum_{j=0}^{v-1} [FT(i, j)]$$

the right-view plane projection image (RT) in the determined format as follows:
supposing $$i = \frac{z_1}{\mu_{zR}} \text{ and } j = \frac{y_1}{\mu_{yR}}, \text{ then}$$

$$RT(i, j) = R(z_1, y_1)$$

$$RT_{uv}(i, j) = \sum_{i=0}^{u-1} \sum_{j=0}^{v-1} [RT(i, j)]$$

the top-view plane projection image (UT) in the determined format as follows:
supposing $$i = \frac{x_1}{\mu_{xU}} \text{ and } j = \frac{z_1}{\mu_{zU}}, \text{ then}$$

$$UT(i, j) = U(x_1, z_1)$$

$$UT_{uv}(i, j) = \sum_{i=0}^{u-1} \sum_{j=0}^{v-1} [UT(i, j)]$$

digitizing depth values according to 0 to (N−1) gray values when generating the depth images in the determined format, where N is the number of the gray values, and in the following computations, depth values, when being decimals, each are rounded to a positive integer no more than (N−1), wherein the depth images in the determined format are as follows:
as to the front-view depth image (FST) in the determined format:
supposing $$i = \frac{x_1}{\mu_{xF}} \text{ and } j = \frac{y_1}{\mu_{yF}}, \text{ then}$$

$$FST(i, j) = \frac{FS(x_1, y_1)}{L} \times (N - 1)$$

$$FST_{uv}(i, j) = \sum_{i=0}^{u-1} \sum_{j=0}^{v-1} [FST(i, j)]$$

as to the right-view depth image (RST) in the determined format:
supposing $$i = \frac{z_1}{\mu_{zR}} \text{ and } j = \frac{y_1}{\mu_{yR}}, \text{ then}$$

$$RST(i, j) = \frac{RS(z_1, y_1)}{W} \times (N - 1)$$

$$RST_{uv}(i, j) = \sum_{i=0}^{u-1} \sum_{j=0}^{v-1} [RST(i, j)]$$

as to the top-view depth image (UST) in the determined format:
supposing $$i = \frac{x_1}{\mu_{xU}} \text{ and } j = \frac{z_1}{\mu_{zU}}, \text{ then}$$

$$UST(i, j) = \frac{US(x_1, z_1)}{H} \times (N - 1)$$

$$UST_{uv}(i, j) = \sum_{i=0}^{u-1} \sum_{j=0}^{v-1} [UST(i, j)].$$

9. An apparatus for processing three-dimensional vision measurement data, comprising:
a data reading module, configured to acquire three-dimensional point cloud data measured by a three-dimensional machine vision measurement system, wherein images measured by the three-dimensional machine vision measurement system meet a pinhole imaging model, the three-dimensional machine vision measurement system refers to a system capable of measuring spatial position information of a viewed object in space and obtaining three-dimensional coordinates and color information or gray information of a view point on the viewed object, including a binocular vision three-dimensional measurement system and a four-camera vision three-dimensional measurement system;
a viewed space setting module, configured to establish a viewed space based on the three-dimensional point cloud data;
a coordinate transformation module, configured to establish a new three-dimensional rectangular coordinate system corresponding to the viewed space, and perform coordinate translation transformation on the three-dimensional point cloud data;

a basic observation plane setting module, configured to determine three basic observation planes corresponding the viewed space and a rectangular coordinate system corresponding to the three basic observation planes;

a projection function generating module, configured to project the transformed three-dimensional point cloud data onto the three basic observation planes, respectively, to obtain three plane projection functions;

a depth value function generating module, configured to generate three depth value functions corresponding to the three plane projection functions based on the transformed three-dimensional point cloud data, respectively;

a two-dimensional image generating module, configured to digitize the three plane projection functions and the three depth value functions, respectively, and transform them into two-dimensional images in a determined format, to obtain three plane projection images and three depth images; and a compression module, a storage module and a display module, configured to compress, store, and display the three plane projection images and the three depth images, respectively.

10. The apparatus according to claim 9, wherein the data reading module is configured to establish a basic three-dimensional rectangular coordinate system OXYZ based on the three-dimensional machine vision measurement system, with the three-dimensional point cloud data represented by $I_{uv}(i, j)$, wherein $$I_{uv}(i, j) = \sum_{i=0}^{u-1}\sum_{j=0}^{v-1}[x(i, j), y(i, j), z(i, j), R(i, j), G(I, j), B(i, j)]$$

or $$I_{uv}(i, j) = \sum_{i=0}^{u-1}\sum_{j=0}^{v-1}[x(i, j), y(i, j), z(i, j), g(i, j)]$$

where the three-dimensional point cloud data are a collection of data of a surface of a viewed object that is obtained from a measurement result of a single measurement by the three-dimensional machine vision measurement system, the collection of data corresponds to a multi-curved distributed spatial structure consisting of discrete points; u and v are the numbers of measurement points or pixel points in a width direction and a height direction of a two-dimensional measurement plane corresponding to the single measurement by the three-dimensional machine vision measurement system, respectively; i and j represent a position of a measurement point or pixel point in the two-dimensional measurement plane, where $0 \le i \le u-1$, $0 \le j \le v-1$, and each of i and j is an integer; x(i, j), y(i, j) and z(i, j) are spatial position coordinates of a view point corresponding to the measurement point or pixel point measured by the three-dimensional machine vision measurement system; R(i, j), G(i, j) and B(i, j) are color values of a surface of the view point corresponding to the measurement point or pixel point measured by the three-dimensional machine vision measurement system; and g(i, j) is a gray value of the surface of the view point corresponding to the measurement point or pixel point measured by the three-dimensional machine vision measurement system.

11. The apparatus according to claim 10, wherein the viewed space setting module is configured to form the viewed space into a rectangular parallelepiped with a depth of L, a width of W and a height of H, based on the three-dimensional point cloud data, wherein $L = z_{max} - z_{min} + \delta l,$ $W = x_{max} - x_{min} + \delta w,$ $H = y_{max} - y_{min} \delta h,$ where $z_{max}$ is a maximum depth coordinate in the three-dimensional point cloud data, $z_{min}$ is a minimum depth coordinate in the three-dimensional point cloud data, $x_{max}$ is a maximum width coordinate in the three-dimensional point cloud data, $x_{min}$ is a minimum width coordinate in the three-dimensional point cloud data, $y_{max}$ is a maximum height coordinate in the three-dimensional point cloud data, $y_{min}$ is a minimum height coordinate in the three-dimensional point cloud data, $\delta l$ is a depth adjustment value of the viewed space, $\delta w$ is a width adjustment value of the viewed space, and $\delta h$ is a height adjustment value of the viewed space.

12. The apparatus according to claim 11, wherein the coordinate transformation module is configured to establish a new three-dimensional rectangular coordinate system $O_1 X_1 Y_1 Z_1$, with the new three-dimensional rectangular coordinate system taking a point $O_1$ at a lower left corner of a face, facing directly the three-dimensional machine vision measurement system, of the rectangular parallelepiped corresponding to the viewed space as a coordinate origin; and in a case that coordinates of $O_1$ in the basic three-dimensional rectangular coordinate system OXYZ are represented by (a, b, c), perform coordinate translation transformation on the three-dimensional point cloud data, to obtain the transformed three-dimensional point cloud data represented by $J_{uv}(i, j)$, wherein $$J_{uv}(i, j) = \sum_{i=0}^{u-1}\sum_{j=0}^{v-1}[(x(i, j) - a), (y(i, j) - b), (z(i, j) - c), R(i, j), G(I, j), B(i, j)]$$

or $$J_{uv}(i, j) = \sum_{i=0}^{u-1}\sum_{j=0}^{v-1}[(x(i, j) - a), (y(i, j) - b), (z(i, j) - c), g(i, j)].$$

13. The apparatus according to claim 12, wherein the basic observation plane setting module is configured to determine the three basic observation planes corresponding to the viewed space as:

a front-view observation plane (F), for which an observation direction is a direction indicated by a $Z_1$-axis arrow, wherein the front-view observation plane has a coordinate origin located at $O_1$, an abscissa axis corresponding to the front-view observation plane is an $X_1$ axis, and an ordinate axis corresponding to the front-view observation plane is a $Y_1$ axis;

a right-view observation plane (R), for which the observation direction is a direction opposite to that indicated by an $X_1$-axis arrow, wherein the right-view observation plane has a coordinate origin located at $O_2$, an abscissa axis corresponding to the right-view observation plane is a $Z_1$ axis, and an ordinate axis corresponding to the right-view observation plane is the $Y_1$ axis; and a top-view observation plane (U), for which the observation direction is a direction opposite to that indicated by a $Y_1$-axis arrow, wherein the top-view observation plane has a coordinate origin located at $O_3$, an abscissa axis corresponding to the top-view observation plane is the $X_1$ axis, and an ordinate axis corresponding to the top-view observation plane is the $Z_1$ axis.

14. The apparatus according to claim 13, wherein the projection function generating module is configured to project the transformed three-dimensional point cloud data onto the three basic observation planes, respectively, and perform coordinate value transformation, to obtain form the projection a front-view plane projection function represented by $[F(x_1, y_1), 0 \le x_1 \le W, 0 \le y_1 \le H]$, a right-view plane projection function represented by $[R(z_1, y_1), 0 \le z_1 \le L, 0 \le y_1 \le H]$ and a top-view plane projection function represented by $[U(x_1, z_1), 0 \le x_1 \le W, 0 \le z_1 \le L]$, wherein for $J_{uv}(i, j)$, as to the front-view plane projection function $F(x_1, y_1)$:
if $x_1 = x(i, j) - a$ and $y_1 = y(i, j) - b$, then $$F(x_1, y_1) = [R(i,j), G(i,j), B(i,j)]$$

or $$F(x_1, y_1) = g(i, j),$$

as to the right-view plane projection function $R(z_1, y_1)$:
if $z_1 = z(i, j) - c$ and $y_1 = y(i, j) - b$, then $$R(z_1, y_1) = [R(i,j), G(i,j), B(i,j)]$$

or $$R(z_1, y_1) = g(i, j),$$

as to the top-view plane projection function $U(x_1, z_1)$:
if $x_1 = x(i, j) - a$ and $z_1 = z(i, j) - c$, then $$U(x_1, z_1) = [R(i,j), G(i,j), B(i,j)]$$

or $$U(x_1, z_1) = g(i, j).$$

15. The apparatus according to claim 14, wherein the depth value function generating module is configured to generate, based on the transformed three-dimensional point cloud data, three depth value functions corresponding to the three plane projection functions, respectively, which are a front-view depth value function represented by $[FS(x_1, y_1), 0 \le x_1 \le W, 0 \le y_1 \le H]$, a right-view depth value function represented by $[RS(z_1, y_1), 0 \le z_1 \le L, 0 \le y_1 \le H]$ and a top-view depth value function represented by $[US(x_1, z_1), 0 \le x_1 \le W, 0 \le z_1 \le L]$, wherein for $J_{uv}(i, j)$, the above depth value functions are generated:

as to the front-view depth value function $FS(x_1, y_1)$:
let $x_1 = x(i, j) - a$ and $y_1 = y(i, j) - b$, then $$FS(x_1, y_1) = z_1 = z(i, j) - c$$

as to the right-view depth value function $RS(z_1, y_1)$:
let $z_1 = z(i, j) - c$ and $y_1 = y(i, j) - b$, then $$RS(z_1, y_1) = W - x_1 = W - (x(i, j) - a)$$

as to the top-view depth value function $US(x_1, z_1)$:
let $x_1 = x(i, j) - a$ and $z_1 = z(i, j) - c$, then $$US(x_1, z_1) = H - y_1 = H - (y(i, j) - b).$$

16. The apparatus according to claim 15, wherein the two-dimensional image generating module is configured to transform each of the front-view plane projection function, the right-view plane projection function, the top-view plane projection function, the front-view depth value function, the right-view depth value function and the top-view depth value function into a two-dimensional image in a determined format having u×v pixel points, with the two-dimensional images in the determined format corresponding to the individual functions represented as a front-view plane projection image FT in the determined format, a right-view plane projection image RT in the determined format, a top-view plane projection image UT in the determined format, a front-view depth image FST in the determined format, a right-view depth image RST in the determined format and a top-view depth image UST in the determined format, respectively;

the two-dimensional image generating module is further configured to determine pixel sizes of the two-dimensional images in the determined format, respectively,
with pixel sizes corresponding to the FT image and the FST image determined as:

$$\mu_{xF} = \frac{W}{u}; \mu_{yF} = \frac{H}{v},$$

with pixel sizes corresponding to the RT image and the RST image determined as:

$$\mu_{zR} = \frac{L}{u}; \mu_{yR} = \frac{H}{v},$$

with pixel sizes corresponding to the UT image and the UST image determined as:

$$\mu_{xU} = \frac{W}{u}; \mu_{zU} = \frac{L}{v}$$

where $\mu_{xF}$ and $\mu_{yF}$ are pixel sizes of the FT image and the FST image in the width direction and in the height direction respectively, $\mu_{zR}$ and $\mu_{yR}$ are pixel sizes of the RT image and the RST image in the width direction and in the height direction respectively, and $\mu_{xU}$ and $\mu_{zU}$ are pixel sizes of the UT image and the UST image in the width direction and in the height direction respectively; after computation of the pixel size, a computed result is obtained to be used as a final pixel size, with digits of a fixed number of the computed result determined as significant digits according to image measurement range and accuracy requirements, wherein the last digit is determined by a rounding-off method, so as to facilitate post processing and computation of the image;

the two-dimensional image generating module is further configured to digitize coordinates of the pixel points in a format of u×v after the pixel sizes are determined, wherein in the following computations, coordinates i or j of the pixel points, when being decimals, each are rounded to a positive integer no more than u or v, so as to for $J_{uv}(i, j)$ generate:

the front-view plane projection image (FT) in the determined format as follows:
supposing $$i = \frac{x_1}{\mu_{xF}} \text{ and } j = \frac{y_1}{\mu_{yF}}, \text{ then}$$

$$FT(i, j) = F(x_1, y_1)$$

$$FT_{uv}(i, j) = \sum_{i=0}^{u-1} \sum_{j=0}^{v-1} [FT(i, j)]$$

the right-view plane projection image (RT) in the determined format as follows:
supposing $$i = \frac{z_1}{\mu_{zR}} \text{ and } j = \frac{y_1}{\mu_{yR}}, \text{ then}$$

$$RT(i, j) = R(z_1, y_1)$$

$$RT_{uv}(i, j) = \sum_{i=0}^{u-1} \sum_{j=0}^{v-1} [RT(i, j)]$$

the top-view plane projection image (UT) in the determined format as follows:
supposing $$i = \frac{x_1}{\mu_{xU}} \text{ and } j = \frac{z_1}{\mu_{zU}}, \text{ then}$$

$$UT(i, j) = U(x_1, z_1)$$

$$UT_{uv}(i, j) = \sum_{i=0}^{u-1} \sum_{j=0}^{v-1} [UT(i, j)]$$

the two-dimensional image generating module is further configured to digitize depth values according to 0 to (N−1) gray values when generating the depth images in the determined format, where N is the number of the gray values, and in the following computations, depth values, when being decimals, each are rounded to a positive integer no more than (N−1), wherein the depth images in the determined format are as follows:

as to the front-view depth image (FST) in the determined format:
supposing $$i = \frac{x_1}{\mu_{xF}} \text{ and } j = \frac{y_1}{\mu_{yF}}, \text{ then}$$

$$FST(i, j) = \frac{FS(x_1, y_1)}{L} \times (N - 1)$$

$$FST_{uv}(i, j) = \sum_{i=0}^{u-1} \sum_{j=0}^{v-1} [FST(i, j)]$$

as to the right-view depth image (RST) in the determined format:
supposing $$i = \frac{z_1}{\mu_{zR}} \text{ and } j = \frac{y_1}{\mu_{yR}}, \text{ then}$$

$$RST(i, j) = \frac{RS(z_1, y_1)}{W} \times (N - 1)$$

$$RST_{uv}(i, j) = \sum_{i=0}^{u-1} \sum_{j=0}^{v-1} [RST(i, j)]$$

as to the top-view depth image (UST) in the determined format:
supposing $$i = \frac{x_1}{\mu_{xU}} \text{ and } j = \frac{z_1}{\mu_{zU}}, \text{ then}$$

$$UST(i, j) = \frac{US(x_1, z_1)}{H} \times (N - 1)$$

$$UST_{uv}(i, j) = \sum_{i=0}^{u-1} \sum_{j=0}^{v-1} [UST(i, j)].$$

* * * * *